US011106249B1

(12) United States Patent
Zimmerman et al.

(10) Patent No.: US 11,106,249 B1
(45) Date of Patent: Aug. 31, 2021

(54) ACCESSORY DEVICE WITH HINGE ASSEMBLY HAVING LAYERED FRICTION ELEMENTS

(71) Applicant: Apple Inc., Cupertino, CA (US)

(72) Inventors: Aidan N. Zimmerman, Sunnyvale, CA (US); Kevin M. Robinson, Sunnyvale, CA (US); Scott J. Krahn, Los Gatos, CA (US); Chien-Tsun Chen, Taipei (TW); Bradley J. Hamel, Portola Valley, CA (US); Arthur Stanley Brigham, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 249 days.

(21) Appl. No.: 16/439,571

(22) Filed: Jun. 12, 2019

Related U.S. Application Data

(63) Continuation of application No. 16/041,633, filed on Jul. 20, 2018, now Pat. No. 10,324,501.

(51) Int. Cl.
| | | |
|---|---|---|
| *G06F 1/16* | (2006.01) | |
| *H05K 5/00* | (2006.01) | |
| *H05K 7/00* | (2006.01) | |
| *E05D 5/02* | (2006.01) | |
| *E05D 7/00* | (2006.01) | |

(52) U.S. Cl.
CPC ............. *G06F 1/1681* (2013.01); *E05D 5/02* (2013.01); *E05D 7/009* (2013.01)

(58) Field of Classification Search
CPC .... G06F 1/1681; G06F 1/1675; G06F 1/1679; G06F 1/1616; G06F 1/1618; G06F 1/162; E05D 7/02; E05D 7/009
USPC ............. 361/679.21–679.29, 679.55, 679.56
See application file for complete search history.

(56) References Cited

U.S. PATENT DOCUMENTS

| | | | |
|---|---|---|---|
| 1,867,346 A | 7/1932 | Bittorf | |
| 4,630,332 A | 12/1986 | Bisbing | |
| 6,304,433 B2 * | 10/2001 | O'Neal ................. | G06F 1/1616 16/334 |
| 7,520,027 B2 * | 4/2009 | Lu ......................... | G06F 1/1616 16/337 |

(Continued)

FOREIGN PATENT DOCUMENTS

JP          6092171 B2     3/2017

OTHER PUBLICATIONS

CFA-ERS Hinges with friction brake, Elesa, 2 pages.

*Primary Examiner* — Anthony M Haughton
(74) *Attorney, Agent, or Firm* — Dickinson Wright RLLP

(57) ABSTRACT

A hinge assembly includes a first and a second set of friction elements engaged each other by an applied force perpendicular to the friction elements. The first and the second set of friction elements are capable of rotational movement about a cylindrical element that passes through each of the friction elements. Also, the first set of friction elements is capable of movement relative to the second set of friction elements. However, the first set friction elements can remain in a fixed position based upon the applied force, until an external force overcomes the applied. During rotation of the first set of friction elements about the cylindrical element, the frictional engagement that controls the position of the first set of friction elements is based primarily on engagement between the friction elements, as opposed to engagement, if any, between the friction elements and the cylindrical element.

20 Claims, 19 Drawing Sheets

(56) References Cited

U.S. PATENT DOCUMENTS

| | | | |
|---|---|---|---|
| 8,549,710 B2 * | 10/2013 | Novin | F16F 1/14 |
| | | | 16/308 |
| 9,557,776 B1 * | 1/2017 | Oakeson | G06F 1/1679 |
| 10,159,158 B2 * | 12/2018 | Park | F16M 11/10 |
| 10,324,501 B1 | 6/2019 | Zimmerman et al. | |
| 2005/0247832 A1 * | 11/2005 | Cho | F16M 11/2021 |
| | | | 248/133 |
| 2014/0063750 A1 * | 3/2014 | Mau | G06F 1/1601 |
| | | | 361/728 |
| 2015/0092335 A1 * | 4/2015 | Patrick | G06F 1/1681 |
| | | | 361/679.27 |
| 2015/0121654 A1 * | 5/2015 | Novin | E05D 3/02 |
| | | | 16/273 |
| 2015/0362962 A1 * | 12/2015 | Lee | G06F 1/1616 |
| | | | 361/679.21 |

\* cited by examiner

ACCESSORY DEVICE WITH HINGE ASSEMBLY HAVING LAYERED FRICTION ELEMENTS

CROSS-REFERENCE TO RELATED APPLICATIONS

The present application is a continuation of U.S. application Ser. No. 16/041,633, entitled "HINGE ASSEMBLY WITH LAYERED FRICTION ELEMENTS," filed Jul. 20, 2018, set to issue as U.S. Pat. No. 10,324,501 on Jun. 18, 2019, the content of which is incorporated herein by reference in its entirety for all purposes.

FIELD

The following description relates to electronic devices and accessory devices for portable electronic devices. In particular, the following description relates to hinge assemblies that can be integrated with the electronic devices and the accessory devices.

BACKGROUND

Some electronic devices (such as laptop computing devices) are known to include multiple housing parts, with one housing part rotatable with respect to another housing part, or vice versa. These electronic devices may include a hinge that promotes the rotational movement. The hinge may include a clip that engages and surrounds a shaft, thereby allowing the clip to maintain (through frictional forces) one housing part in a fixed position with respect to another housing part. When the frictional forces between the clip and the shaft are overcome, the housing part may again rotate with respect to another housing part.

However, this design implementation has some drawbacks. For example, rotational movement of the clip, relative to the shaft, generates a torsional force on the shaft that is proportional to the normal force applied by the clip on the shaft and the force from the coefficient of friction. As a result, one location of the shaft is rotated, or twisted, with respect to another location. This twisting effect may cause stress to the shaft that, over times, causes breakdown of the shaft. Also, as hinge parts become smaller, a force (intended rotate the housing part) is applied to the housing part, the hinge parts may bend and twist, and act like a spring, before the relative motion between the clip and shaft occur. This spring-like action is generally undesirable, as it appears the laptop computing device lacks rigidity.

SUMMARY

In one aspect, a laptop computer having a first housing part and a second housing part is described. The laptop computing device may include a hinge assembly. The hinge assembly may include a first friction element coupled with the first housing part. The first friction element may include an annular first friction surface that surrounds a first opening. The hinge assembly may further include a second friction element coupled with the second housing part. The second friction element may include an annular second friction surface that surrounds a second opening and that engages with the first friction surface to provide a first friction force. The hinge assembly may further include an axial component that passes through the first opening and the second opening. The hinge assembly may further include a tensioning member engaged with the axial component. The tensioning member can be capable of providing an adjustable force, by way of the axial component, that is normal to the first friction surface and the second friction surface. In some embodiments, the adjustable force, when applied to either the first frictional element or second frictional element, is capable of changing the first friction force to a second friction force different from the first friction force. Also, in some instances, the adjustable force may change only during assembly, or may occur as the friction elements rotate relative to each other, through the use of ramp or cam features.

In another aspect, an accessory device for use with a portable electronic device is described. The accessory device may include a first section. The accessory device may further include a second section. The accessory device may further include a hinge assembly. The hinge assembly may include a first friction element that includes a first extension coupled with the first section. The first friction element may further include a first engagement surface. The hinge assembly may further include a second friction element that includes a second extension coupled with the second section. The second friction element may further include a second engagement surface. The hinge assembly may further include a third friction element positioned between the first friction element and the second friction element. The third friction element can be engaged with the first engagement surface and the second engagement surface by an applied force that is perpendicular to the first friction element and the second friction element. The hinge assembly may further a cylindrical element passing through the first friction element, the second friction element, and the third friction element. In some embodiments, the applied force to the first section causes rotation of the first section and the first friction element about the cylindrical element. Also, in some embodiments, when the applied force is removed the first section remains stationary.

In another aspect, an accessory device for use with a portable electronic device is described. The accessory device may include a first section. The accessory device may further include a second section coupled to, and rotatable with respect to, the first section based on a hinge assembly. The hinge assembly may include a first hinge section that includes a first set of friction elements. The hinge assembly may further include a second hinge section that includes a second set of friction elements engaged with the first set of friction elements to define a frictional engagement. The hinge assembly may further include a cylindrical element passing through the first set of friction elements and the second set of friction elements. In some embodiments, the frictional engagement between the first set of friction elements and the second set of friction elements holds the first section in a fixed position relative to the second section.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
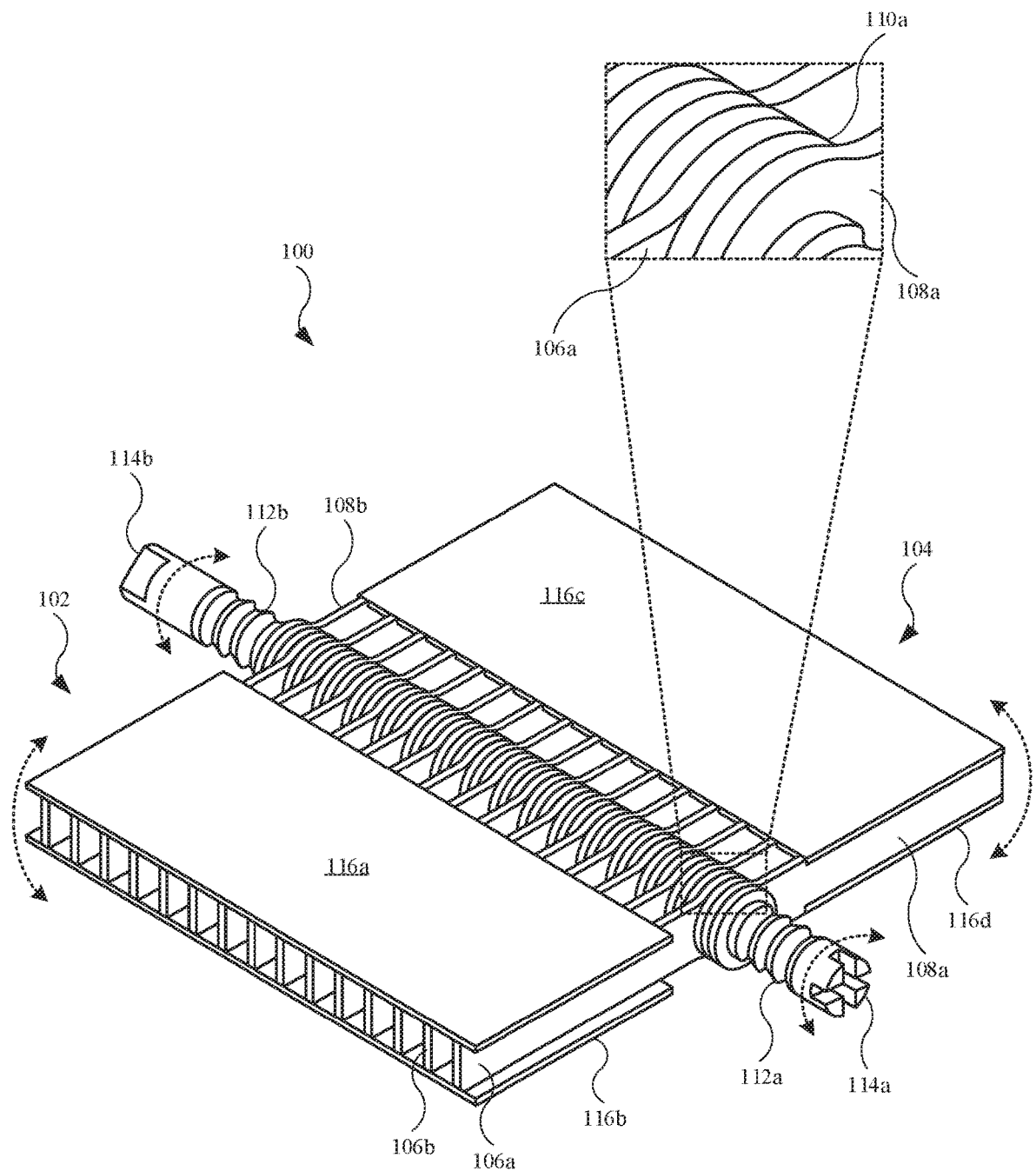
FIG. 1 illustrates an isometric view of an embodiment of a hinge assembly, in accordance with some described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to a hinge assembly adapted for use with consumer products, such as accessory devices (such as covers, folios, etc.) used with portable electronic devices. The hinge assembly (or assembly) may be integrated with electronic devices such as laptop computing devices. The hinge assembly can provide a constant and/or variable torque depending on specific design and user considerations. For example, when the design requires that a first housing component (or first section) of the consumer product retain a fixed position, or angular displacement, relative to a housing component (or second section) in an open configuration, the hinge assembly can provide an overall hinge assembly torque that can balance a torque generated by the first housing component in the open configuration. Component torque $\tau_{comp}$ generated by the first housing component can be related to a relative position of the first housing component to the second housing component being within a range of angular displacement. Accordingly, the hinge assembly can include a number of torque generating components, each of which provide a torque $\tau_i$ that combines to provide the overall hinge assembly torque $\tau_{hinge}$ in accordance with Equation (1) below:

$$\tau_{hinge} = \sum_1^n \tau_i \geq \tau_{comp}. \quad \text{Eq. (1)}$$

Equilibrium requires that the overall hinge assembly torque $\tau_{hinge}$ be equal to or greater than a maximum value of the component torque $\tau_{comp}$ that occurs when the first housing component is essentially parallel with respect to the second housing component (i.e., angular displacement $\theta \approx 0°$).

Some embodiments of hinge assemblies include a constant torque component, such as a friction clip or C-clip, that engages the shaft with frictional force $F_f$ applied at a surface of the shaft a distance $r_s$ from the axis of rotation resulting in constant torque $\tau_{const}$ according to Equation (2) below:

$$\tau_{const} = F_f * r_s \quad \text{Eq. (2).}$$

Traditional consumer devices often use a hinge with a shaft and a C-clip engaged with the shaft. The C-clip maintains engagement with the shaft by a force in a radial direction relative to the shaft, with the radial direction normal to the curved surface of the shaft. When the C-clip rotates about the shaft, the C-clip generates friction in a tangential direction (around the curved surface of the shaft), leading to torsional, or angular, deflection of the shaft. The torsional deflection can impart a rotational force that causes the shaft to twist. Over several cycles, the shaft can undergo deformation from twisting, leading to reduced performance of the hinge. Also, an external force applied to the C-clip can generate a frictional force that is counter to (or opposite in the direction of) the torsional deflection. In other words, the frictional force can initially resist relative movement of the C-clip and the shaft, which can cause bending of the first housing component of the consumer product until the applied force overcomes the frictional force resulting in relative movement of the first housing part with respect to the second housing part.

However, some hinge assemblies described herein can include an enhanced design to overcome these issues. For example, a hinge assembly described herein may include multiple friction elements, with adjacent friction elements in frictional engagement with one another. The phrase "frictional engagement" or "frictionally engaged" refers one or more pairs of friction elements in contact with each other such that relative movement of one friction element with respect the other frictional element causes friction. Accordingly, the friction elements are designed to generate friction during relative rotational movement. In the embodiments described herein, the friction elements may include stainless steel parts that are cut by a stamping operation. Some friction elements may include a "leaf" that takes the shape of a flat plate with a rounded portion and an extension, while other friction elements are generally circular. In one embodiment, the friction elements can take the form of an annular ring where the friction element may include a through hole, or opening centered at the frictional element (in some cases, the through hole can be offset from the center of the frictional element. The hinge assembly may include a cylindrical element, or shaft, that passes through each of the friction elements via their respective through holes. In this regard, cylindrical element can align the friction elements along an axis defined by the cylindrical element.

The friction elements maintain engagement with each other by a force in an axial direction that is parallel to an axis of the shaft and perpendicular to the friction elements, as opposed to the engagement force (between the C-clip and the shaft) in the tangential direction. As a result, the torsional deflection of the shaft during relative motion of the components is reduced, and the hinge assembly is less susceptible to deformation over time due to less wear on the shaft. Also, during relative movement, the friction elements generally do not rely on engagement with the shaft. In this manner, the frictional force exerted on the shaft by the friction elements is reduced, and the bending of housing components (prior to relative motion) can be reduced or eliminated. Other modifications to the shaft can reduce torsional deflection of the shaft, including (but not limited to) an increase in the diameter of the shaft and reducing the shaft's axial dimension. Regarding the latter, an additional (separate) shaft can be incorporated if needed.

For hinge assemblies described herein, the torque T required to rotationally drive the friction elements is governed by Equation (3) (from Shigley's Mechanical Engineering Design) below:

$$T = \frac{2}{3}\mu_S F \left(\frac{r_0^3 - r_i^3}{r_0^2 - r_i^2}\right)(N-1). \quad \text{Eq. (3)}$$

The variable $\mu_s$ is the coefficient of static friction that is related to the frictional force developed between friction elements when neither of the friction elements are moving and are thereby in static equilibrium. It should be noted that the coefficient of kinetic friction $\mu_k$ can also refer to the force between friction elements when the friction elements are moving with respect to each other (relative movement), or if multiple friction elements are moving against each other. The force F is force applied normally to the friction elements (for example, in an axial direction defined by the cylindrical element) that maintains adjacent friction element in contact with each other. The outer radius $r_0$ and the inner radius $r_i$ represent an outer and inner radius, respectively, of a frictional element having an annular geometry. Further, the difference between the outer radius $r_0$ and the inner radius $r_i$ corresponds to an annular surface area of the frictional element whereas the variable N represents the number of engaged friction elements.

Each hinge assembly includes a "break torque" or torsional force required to initiate relative motion between the hinge assembly parts. In order to alter the break torque without changing the material of the friction elements, the hinge assembly may include one or more tensioning members coupled to the cylindrical element. The tensioning members may include a pre-loaded member (such as a spring) designed to adjust (increase or decrease) the force F applied to the friction elements. Accordingly, the hinge assembly described herein may include an adjustable torque feature, thereby allowing for a modification of the total torque T of the hinge assembly by adjusting the tensioning member(s). In this way, a modification of the torque T of the hinge assembly allows for a modification of the force required to rotationally drive the hinge assembly. In this regard, the torque required to rotationally drive the hinge assembly increases while maintaining the same footprint (that is, the same size and shape) of the hinge assembly. In other words, the hinge assembly is not required to increase in the overall size and shape to provide a corresponding increased torque. As a result, consumer devices that incorporate one or more hinge assemblies described herein require less dedicated space for the hinge assemblies. Further, engagement between several friction elements increases the overall effective surface area of the hinge assembly used for rotational movement, which can lead to reduced surface pressure acting on the hinge assembly and therefore less overall stress on the parts. By providing an adjustable torque feature, the hinge assemblies described herein may perform more reliably when integrated with consumer devices. For example, using the tensioning members, the break torque can be adjusted subsequent to assembly of the hinge assembly. As a result, the hinge assembly can compensate for some manufacturing variances in the hinge assembly parts, and can perform in accordance with a predictable or predetermined break torque.

In order to limit movement of the hinge sections, some hinge assemblies described herein may include an integrated stop mechanism. These hinge assemblies may include modified friction elements as well as additional cylindrical elements designed to limit or prevent movement of the modified frictional elements beyond a predetermined rotational, or angular, movement. Accordingly, the integrated stop mechanism limits the movement of the hinge assembly to predetermined angles.

These and other embodiments are discussed below with reference to FIGS. 1-28. However, those skilled in the art will readily appreciate that the detailed description given herein with respect to these Figures is for explanatory purposes only and should not be construed as limiting.

FIG. 1 illustrates an isometric view of an embodiment of a hinge assembly 100, in accordance with some described embodiments. The hinge assembly 100 may include a first hinge section 102 and a second hinge section 104. As indicated by arrows, the hinge assembly 100 is designed such that the first hinge section 102 is capable of moving (rotating, for example) with respect to the second hinge section 104, and vice versa. Although not shown in FIG. 1, the first hinge section 102 and the second hinge section 104 may couple to a first body and a second body, respectively, of a consumer device, thereby allowing the first body to rotate with respect to the second body, and vice versa.

The hinge assembly 100 may include several layers of material designed for rotational movement. For example, the hinge assembly 100 may include a friction element 106a and a friction element 108a. As shown in FIG. 1, the friction element 106a is associated with the first hinge section 102 and the friction element 108a is associated with the second hinge section 104. Although not labeled, the hinge assembly 100 may include several additional friction elements similar to the friction element 106a and the friction element 108a. Also, each frictional element may include a material, such as stainless steel or other hardened metal. However, other material(s) is/are possible. For example, the friction elements may include a metal alloy that includes stainless steel with plated nickel.

As shown in the enlarged view, the friction element 106a is separated from the friction element 108a by a friction element 110a. The friction element 110a may include multiple engagement surfaces, with one engagement surface in frictional engagement with the friction element 106a, and another engagement surface in frictional engagement with the friction element 108a. Although not shown in FIG. 1, each of the friction elements may include a through hole, or opening, through which a cylindrical element (shown later) passes. While the friction element 110a may appear like a washer (that is, a donut-shape), the friction element 106a and the friction element 108a may include a both a round shaper similar to a washer, as well as an extension. This will be further shown below. The applied torque required to rotate the first hinge section 102 with respect to the second hinge section 104, or vice versa, is function of the normal (perpendicular) force between the friction elements. For example, the applied torque required to rotationally drive one of the hinge sections is a function of the normal force between the friction element 110a and the friction element 106a, as well as the normal force between the friction element 110a and the friction element 108a.

During rotation, the engagement between the friction elements is maintained, which may provide a predictable and repeatable applied torque required to rotate the hinge sections. Also, the engagement between the friction elements is sufficient to maintain the hinge sections in fixed positioned when the applied torque is removed. For example, when the first hinge section 102 is rotated (with respect to the second hinge section 104) from a first position to a second position, the first hinge section 102 remains fixed in the second position when the applied force that causes the rotation ceases.

The hinge assembly 100 may further include tensioning members designed to adjust the normal force between the aforementioned friction elements. For example, the hinge assembly 100 may include a tensioning member 112a and a tensioning member 112b capped by a fastener 114a and a fastener 114b, respectively. The tensioning members may include spring or other pre-loaded components designed to adjust the applied force (or normal force) between the friction elements. As an example, by rotationally driving the fastener 114a, the tensioning member 112a and/or the tensioning member 112b may compress, causing an increase in the applied force to the friction elements. As a result of the increased applied force, the torque required to rotate the first hinge section 102 relative to the second hinge section 104, or vice versa, increases. Conversely, the fastener 114a can be rotationally driven in the opposite direction to decompress the tensioning member 112a and/or the tensioning member 112b, thereby decreasing the applied force to the frictional elements. The advantage of using tensioning members allows for the hinge assembly 100 to provide an adjustable, fine-tuned torque without changing the dimensions of the hinge assembly 100. In this manner, when the hinge assembly 100 is integrated with a consumer device (such as a laptop or a folio case), the space occupied by the hinge assembly 100 is minimized.

The hinge assembly 100 may include several panels coupled to at least some of the friction elements. For example, the hinge assembly 100 may include a panel 116a and a panel 116b. Further, friction elements, such as the friction element 106a and a friction element 106b, may be secured to the panel 116a and the panel 116b by adhesives or welding, as non-limiting examples. The hinge assembly 100 may include a panel 116c and a panel 116d. Friction elements, such as the friction element 108a and the friction element 108b, may be secured to the panel 116c and the panel 116d by means described above. In some instances, at least one of the tensioning member 112a or the tensioning member 112b may be used to adjust the torque prior to securing the friction elements to the panels. Also, the friction element 106a, the friction element 106b, and other friction elements coupled to the panel 116a and the panel 116b be may be part of the first hinge section 102, while the friction element 108a, the friction element 108b, and other friction elements coupled to the panel 116c and the panel 116d may be may be part of the second hinge section 104. The aforementioned panels may provide surface in which the hinge assembly 100 may couple to one or more parts, including parts of a consumer device. The securing means may include welding or adhesives, as non-limiting examples. Alternatively, or in combination, the securing means may include fasteners positioned through openings formed in the panels. This will be shown below.

The outermost (or most external) friction elements of the hinge assembly 100 may be part of one of the first hinge section 102 or the second hinge section 104, which may cause the number of friction elements associated with the first hinge section 102 to differ from the number of friction elements associated with the second hinge section 104. For example, as shown in FIG. 1, the friction element 108a and the friction element 108b are the outermost friction elements of the hinge assembly 100, and are part of the second hinge section 104. In this manner, an adjustment by one of tensioning member 112a or the tensioning member 112b does not cause a change in torque that causes the fastener 114a or the fastener 114 to decouple from the hinge assembly 100. In order to further prevent a decoupling of the fastener 114 from the hinge assembly 100, the fastener 114b may be secured to friction elements or the cylindrical element (not shown in FIG. 1) by adhesives or welding (including laser welding), in addition to a threaded engagement between the cylindrical element and the fastener 114b. When a single tensioning member is present (such as the tensioning member 112a), the fastener 114b may be coupled (welded or adhesively secured) to the outermost friction element. Also, with one hinge section having the outermost friction elements, the hinge assembly 100 may include an unequal number of friction elements associated with each hinge section. For example, the first hinge section 102 may include an odd number of friction elements, while the second hinge section 104 may include an even number of friction elements. The equal/odd number of friction elements may vary with respect to the hinge sections in different embodiments.

Figure 2:
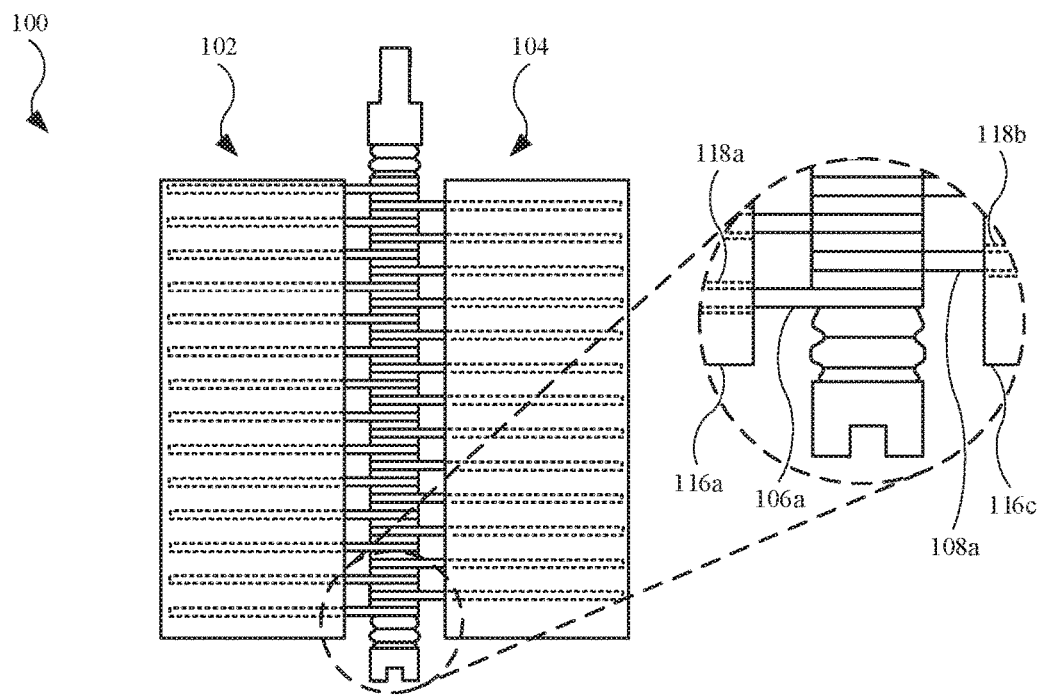
FIG. 2 illustrates a plan view of the hinge assembly shown in FIG. 1.

FIG. 2 illustrates a plan view of the hinge assembly 100 shown in FIG. 1. As shown in the enlarged view, the friction element 106a is secured to the panel 116a by a weld 118a. Also, the friction element 108a is secured to the panel 116c by a weld 118b. Although not shown in FIG. 2, the remaining friction elements associated with the first hinge section 102 are welded to the panel 116a and the panel 116b (shown in FIG. 1), and the remaining friction elements associated with the second hinge section 104 are welded to the panel 116c and the panel 116d (shown in FIG. 1).

Figure 3:
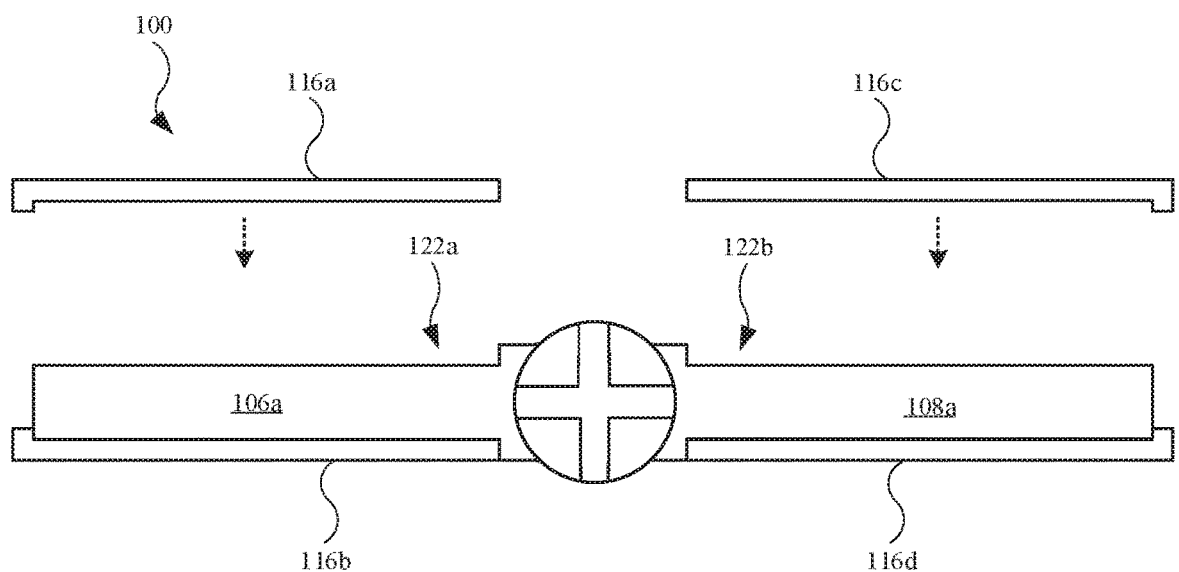
FIG. 3 illustrates a side view of the hinge assembly shown in FIG. 1.

FIG. 3 illustrates a side view of the hinge assembly 100 shown in FIG. 1. In order to provide a low profile hinge assembly, several friction elements may include notches. For example, the friction element 106a may include a notch 122a having size and shape in accordance with the panel 116a, and the friction element 108a may include a notch 122b having size and shape in accordance with the panel 116c. Accordingly, when the panel 116a and the panel 116c are coupled to the friction element 106a and the friction element 108a, respectively, the panel 116a is seated co-planar, or flush, with a surface of the friction element 106a, and the panel 116c is seated co-planar, or flush, with a surface of the friction element 108a. Due to additional notches (not labeled in FIG. 3) in the aforementioned friction elements, the panel 116b is co-planar with a surface of the friction element 106a, and the panel 116d is co-planar with a surface of the friction element 108a. It should be noted that the remaining friction elements include notches similar to those shown and described for the friction element 106a and the friction element 108a.

Figure 4:
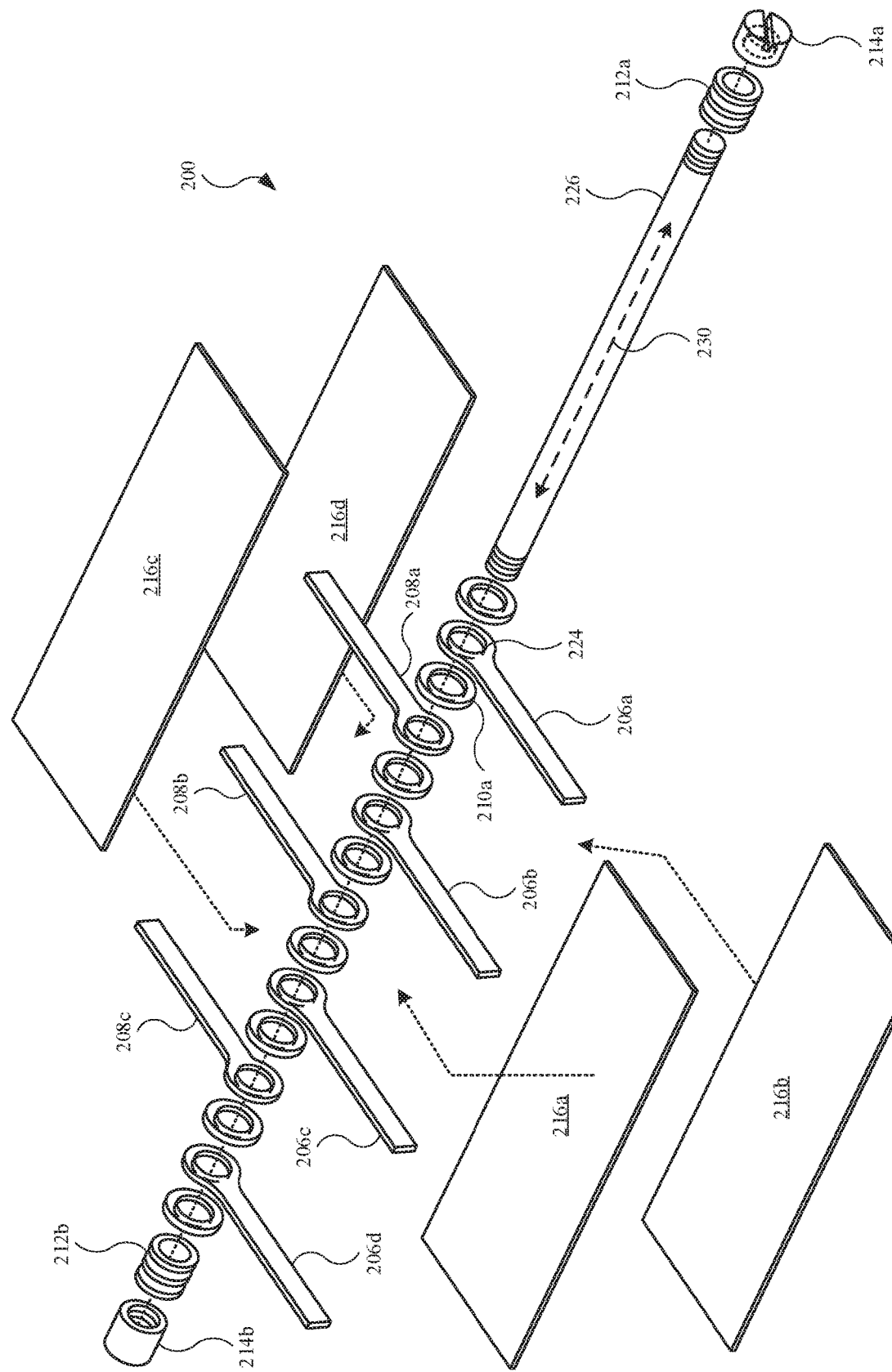
FIG. 4 illustrates an exploded view of an embodiment of a hinge assembly, showing various structural elements of the hinge assembly, in accordance with some described embodiments.

FIG. 4 illustrates an exploded view of an embodiment of a hinge assembly 200, showing various structural elements of the hinge assembly, in accordance with some described embodiments. The hinge assembly 200 may include components and associated features shown and described for the hinge assembly 100 (shown in FIG. 1). Further, the hinge assembly 100 (shown in FIG. 1) may include components and associated features shown and described for the hinge assembly 200.

As shown in FIG. 4, the hinge assembly 200 may include several friction elements, including a friction element 206a, a friction element 208a, and a friction element 210a positioned between the friction element 206a and the friction element 208a. The hinge assembly 200 may include multiple plates, such as a plate 216a and a plate 216b, designed to secure with the friction element 206a as well as additional friction elements, such as a friction element 206b, a friction element 206c, and a friction element 206d. The hinge assembly 200 may further include additional plates, such as a plate 216c and a plate 216d, designed to secure with the friction element 208a as well as additional friction elements, such as a friction element 208b and a friction element 208c.

Each of the aforementioned friction elements, as well as remaining friction elements, may include an opening, or through hole. For example, the friction element 206a may include an opening 224. The hinge assembly 200 may further include a cylindrical element 226, or shaft. The cylindrical element 226 is designed to pass through each of the friction elements via their respective opening. In this regard, the cylindrical element 226 may act as an alignment member that aligns each of the friction elements in a desired manner.

The hinge assembly 200 may further include a tensioning member 212a and a tensioning member 212b. As shown, the aforementioned tensioning members may include an opening (not labeled in FIG. 4) through which the cylindrical element 226 passes. The hinge assembly 200 may further include a fastener 214a and a fastener 214b, with each fastener secured (by threaded engagement, example) to opposing ends of the cylindrical element 226 by a threaded engagement with the cylindrical element 226. Additionally, the fastener 214b may be coupled to the cylindrical element 226 by adhesives or welding.

When the fastener 214a and the fastener 214b are coupled to the cylindrical element 226, the tensioning member 212a and the tensioning member 212b may provide a force along a direction defined by an axial axis 230. The axial axis 230 may refer to a major length of the cylindrical element 226. The force in the direction of the axial axis 230 is a normal (perpendicular) force with respect to the friction elements. This normal force may cause adjacent friction elements to engage one another. Furthermore, the force provided by the aforementioned tension members can be adjusted. For example, similar to a prior embodiment, the fastener 214a may be rotationally driven, thereby causing the tensioning member 212a and/or the tensioning member 212b to increase (or alternatively, decrease) an applied force to the friction elements along the axial axis 230. The ability to adjust (increase or decrease) the torque required to rotate the friction elements about the cylindrical element 226 allows a manufacturer of the hinge assembly 200 to set a desired torque for a given application.

Unlike traditional hinges that rely upon frictional engagement with the cylindrical element, the hinge assembly 200 relies upon frictional engagement between the friction elements. This relationship results in minimal (and in some instances, negligible) frictional engagement with the cylindrical element 226, as compared to the traditional hinge. As a result, the cylindrical element 226 undergoes minimal, if any, torsional stresses, and the wear of the cylindrical element 226 due to usage of the hinge assembly 200 is minimal.

Figure 5:
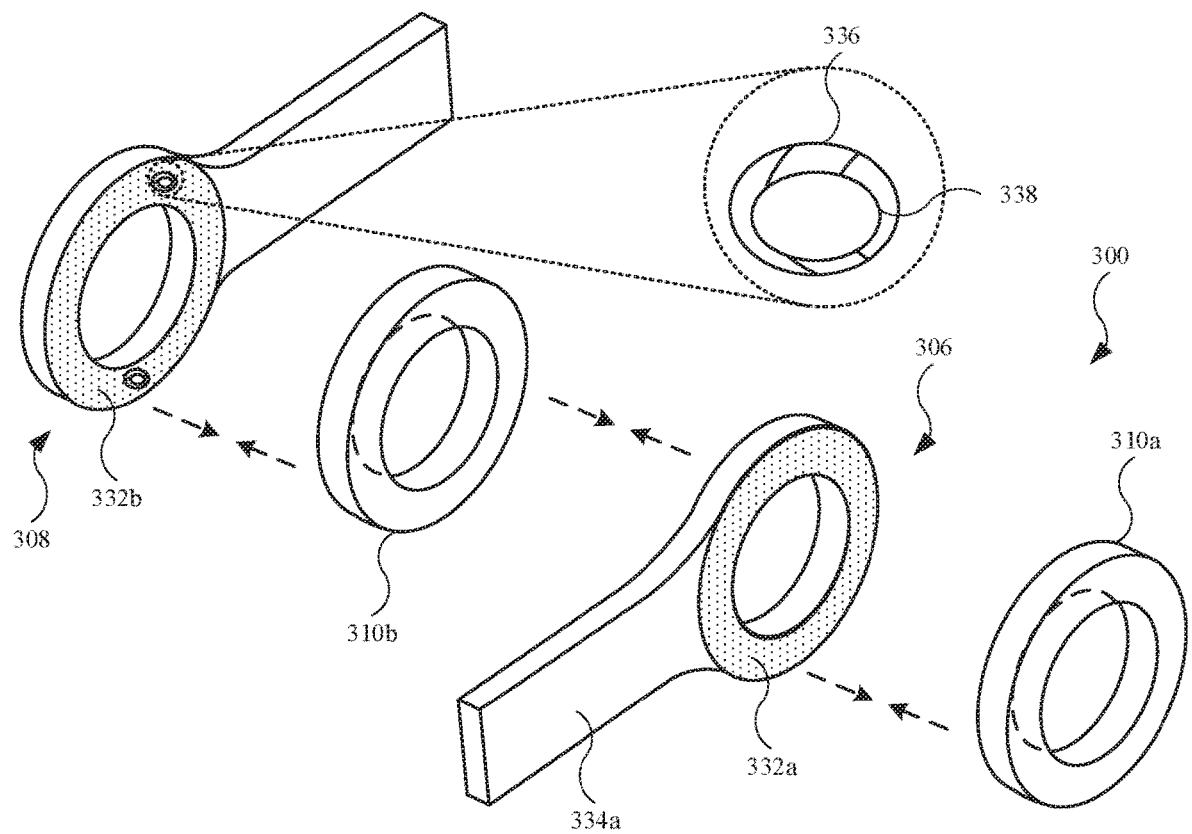
FIG. 5 illustrates an exploded view of an embodiment of hinge assembly, showing relationships and features of several friction elements, in accordance with some described embodiments.

FIG. 5 illustrates an exploded view of an embodiment of a hinge assembly 300, showing relationships and features of friction elements, in accordance with some described embodiments. When positioned between two friction elements, a friction element can engage the two friction elements via engagement surfaces. For example, when the hinge assembly 300 is assembled, a friction element 306 may be in frictional engagement with a friction element 310a and a friction element 310b. Further, the friction element 306 may include an engagement surface 332a (shaded area) and an extension 334a (or wing) that extends from the engagement surface 332a. The engagement surface 332a is designed for frictional engagement with an engagement surface (not shown in FIG. 5) of the friction element 310a. Accordingly, engagement surfaces may also be referred to as friction surfaces. The engagement surface 332a may generally have a corresponding size and shape as that of the engagement surface of the friction element 310a. Also, the engagement surface 332a is flat, or generally flat, and the engagement surface of the friction element 310a is also flat. The friction element 310b is designed for frictional engagement an engagement surface 332b (shaded area) of a friction element 308 and an engagement surface (not shown in FIG. 5) of the friction element 306. Also, the engagement surface 332b is flat, or generally flat, and the engagement surface of the friction element 310b is also flat. Also, the friction elements can be aligned parallel to each other, and as a result, the engagement surfaces are parallel, or at least generally, parallel with each other.

In order to alter the torque of a hinge assembly 300, at least some friction elements may include modifications. For example, as shown in the enlarged view, the friction element 308 may include a recess 336 and a lubricating material 338 positioned in the recess 336. The lubricating material 338 may include grease or oil, as non-limiting examples. The recess 336 may provide storage for the lubricating material 338, and the lubricating material 338 may provide a reserve lubricating material to compensate for a loss of an initial lubricating material (not shown in FIG. 5) applied to the engagement surface 332b. It should be noted the recess 336 is enlarged for purposes of illustration, and when implemented, the recess 336 include one of several micro-recesses having a diameter that is less than 1 millimeter.

Figure 6:
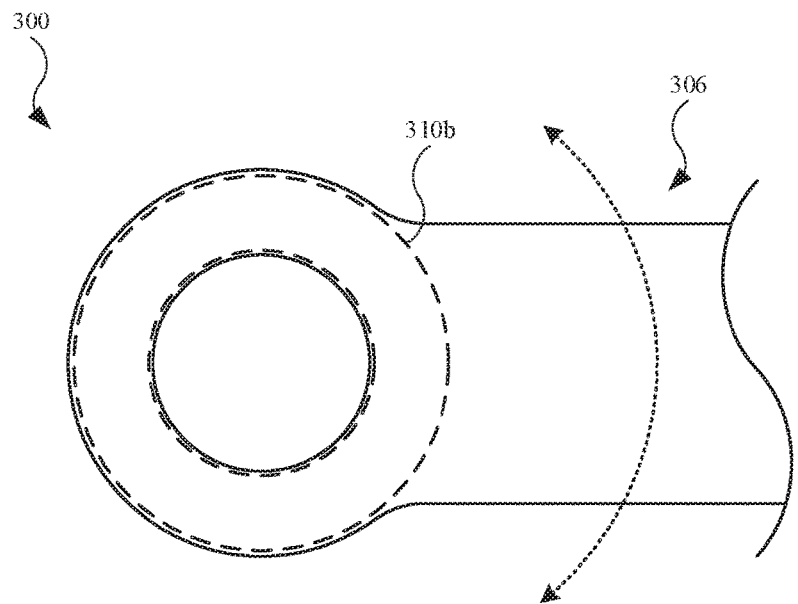
FIG. 6 illustrates a plan view of the hinge assembly shown in FIG. 5, showing the friction elements engaged with each other.

FIG. 6 illustrates a plan view of the hinge assembly 300 shown in FIG. 5, showing the friction elements engaged with each other. As shown, the friction element 306 may be rotationally driven relative to the friction element 310b in at least two different directions, based upon the direction of the applied force to the friction element 306. However, in some instances, the rotation of the friction element 306 may impart at least some rotation to the friction element 310b.

Figure 7:
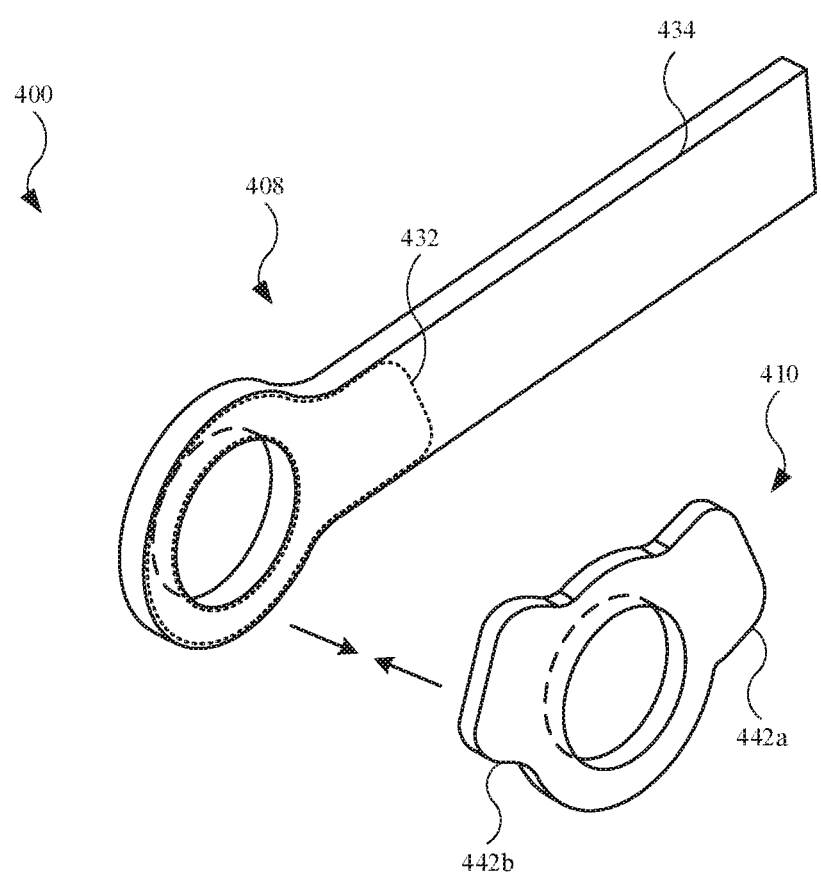
FIG. 7 illustrates an exploded view of an embodiment of a hinge assembly, showing a friction element with multiple cams, in accordance with some described embodiments.

FIG. 7 illustrates an exploded view of an embodiment of a hinge assembly 400, showing a friction element 410 having multiple cams, in accordance with some described embodiments. The hinge assembly 400 may include a friction element 408 and a friction element 410 designed for frictional engagement with the friction element 408. While prior embodiments of friction elements are generally round, the friction element 410 shown in FIG. 7 may include a cam 442a and a cam 442b, with each cam defining an extended engagement surface of the friction element 410. In certain angular positions of the friction element 408 relative to the friction element 410 (or vice versa), at least one of the cam 442a or the cam 442b is in frictional engagement with the friction element 408. For example, when the cam 442a engages an extension 434 of the friction element 408, an engagement surface 432 (represented by a dotted line) extends onto the extension 434. The additional engagement between the friction element 408 and the friction element 410 (due to the cam 442a) may increase the coefficient of friction between the friction element 408 and the friction element 410, thereby increasing the torque required to rotationally drive the friction element 408. The relationship (that is, the increased coefficient of friction) may occur until the cam 442a is no longer engaged with the friction element 408.

Figure 8:
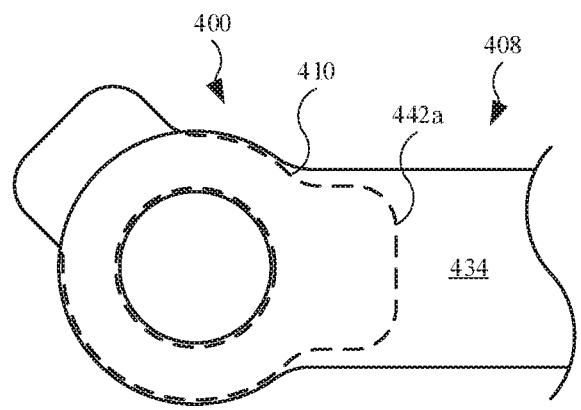
FIG. 8 illustrates a plan view of the hinge assembly shown in FIG. 7, showing the friction elements engaged with each other.
Figure 9:
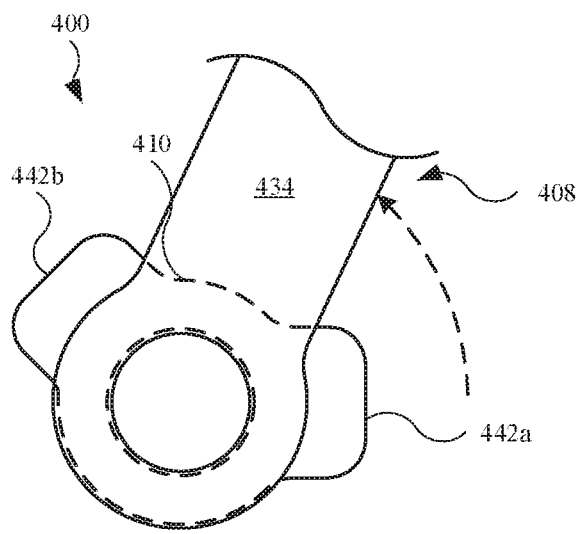
FIG. 9 illustrates a plan view of the hinge assembly shown in FIG. 8, showing a friction element rotated with respect to another friction element.
Figure 10:
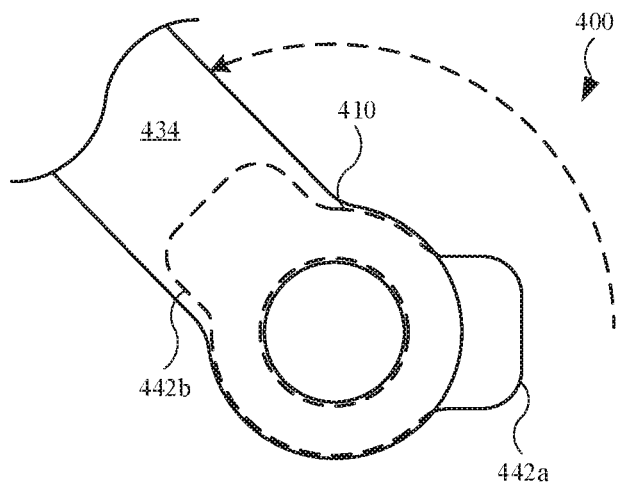
FIG. 10 illustrates a plan view of the hinge assembly shown in FIG. 9, showing further rotation of the friction element with respect to the other friction element.

FIGS. 8-10 represent various angular positions of the friction element 408 relative to the friction element 410, that results in variable engagement between the friction element 408 and the friction element 410. The variable engagement may provide the hinge assembly 400 with a variable torque.

FIG. 8 illustrates a plan view of the hinge assembly 400 shown in FIG. 7, showing the friction elements engaged with each other. As shown, the cam 442a of the friction element 410 is engaged with the friction element 408 along the extension 434. As a result, the torque required to rotate the friction element 408 increases based upon the additional engagement due to the cam 442a resulting in an additional coefficient of friction.

FIG. 9 illustrates a plan view of the hinge assembly 400 shown in FIG. 8, showing a friction element 408 rotated with respect to the friction element 410. As shown, the friction element 408 is rotated such that the neither the cam 442a nor the cam 442b is engaged with the extension 434 of the friction element. As a result, the torque required to rotate the friction element 408 is reduced, as compared to the configuration in FIG. 8, based upon the reduced engagement between the friction element 408 and the friction element 410.

FIG. 10 illustrates a plan view of the hinge assembly 400 shown in FIG. 9, showing further rotation of the friction element 408 with respect to the friction element 410. As shown, the cam 442b of the friction element 410 is engaged with the friction element 408 along the extension 434. The torque required to rotate the friction element 408 is increased, as compared to the configuration in FIG. 9, based upon the additional engagement due to the cam 442b.

A hinge assembly that provides variable torque, when integrated into a consumer device, may provide certain benefits. For example, when a variable torque hinge assembly is integrated into a laptop computer (not shown in FIGS. 8-10), the variable torque hinge assembly may provide a relatively high torque in a closed position of the laptop computer, defined by a display housing positioned over a base portion. The friction elements may be poisoned in a manner similar to what is shown in FIG. 8. However, when the display housing is rotated away from the base portion, the friction elements may be poisoned in a manner similar to what is shown in FIG. 9, and variable torque hinge assembly provides a relatively low torque, resulting a relatively lower force required to rotationally move display. When a certain angle (an angle approximately in the range of 90 to 135 degrees, for example) between the display housing and the base portion is reached, the laptop computer is in the open position and the variable torque hinge assembly may again increase to a relatively high torque. In the open position, the friction elements may be poisoned in a manner similar to what is shown in FIG. 10.

Figure 11:
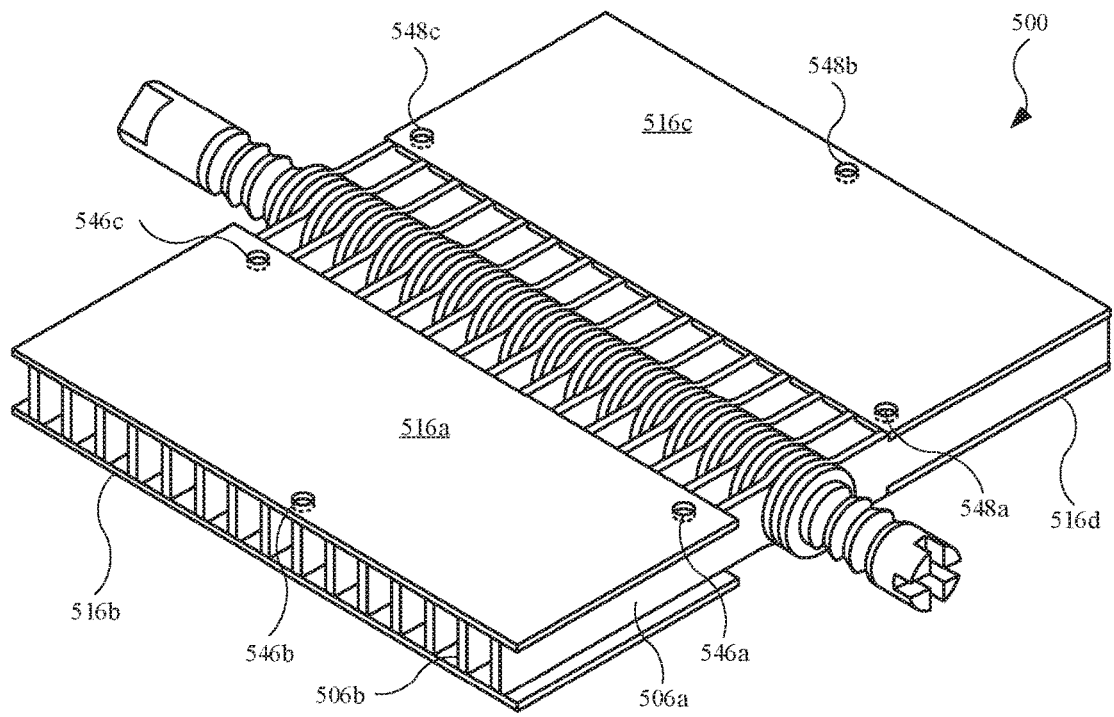
FIG. 11 illustrates an isometric view of an alternate embodiment of a hinge assembly, showing the hinge assembly having panels with openings, in accordance with some described embodiments.
Figure 12:
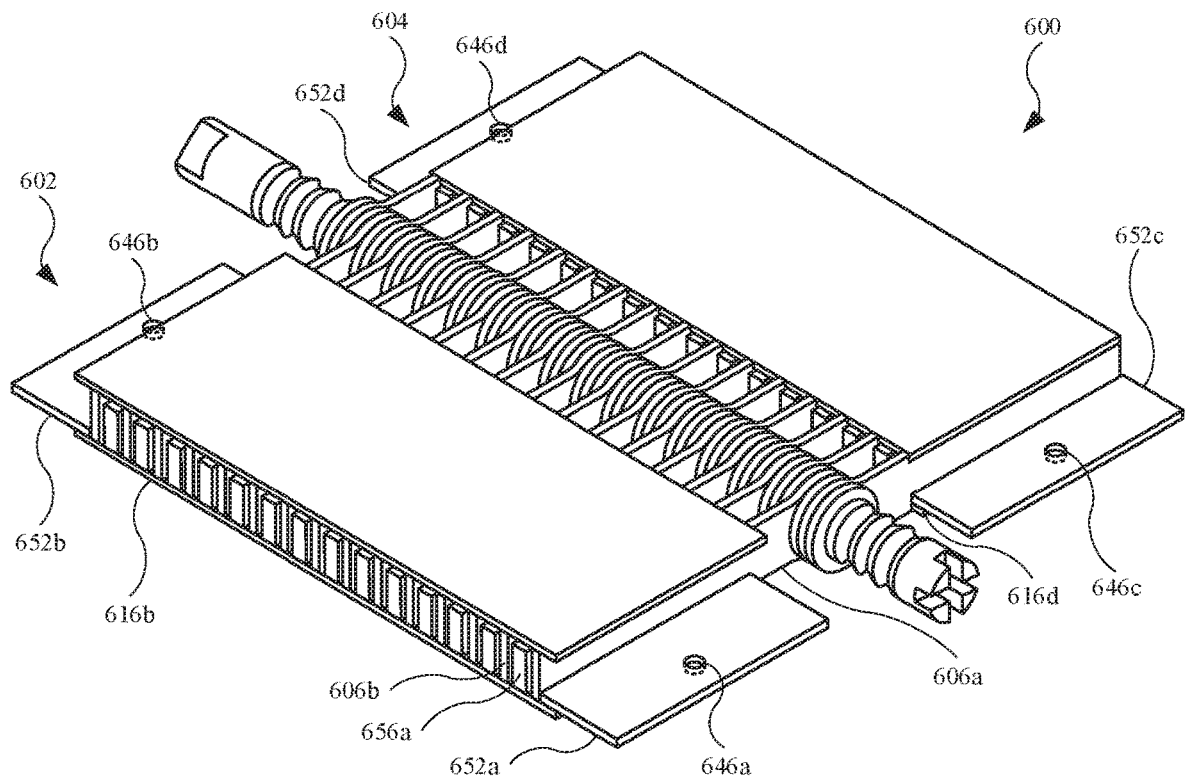
FIG. 12 illustrates an isometric view of an alternate embodiment of a hinge assembly, showing the hinge assembly having panels coupled to additional panels that include openings, in accordance with some described embodiments.

FIGS. 11 and 12 illustrate hinge assemblies with alternate mounting configurations. The hinge assemblies may include various components and features described herein for a hinge assembly. Also, the mounting configurations shown and described in FIGS. 11 and 12 may be integrated into other hinge assemblies described herein.

FIG. 11 illustrates an isometric view of an alternate embodiment of a hinge assembly 500, showing the hinge assembly 500 having panels with openings, in accordance with some described embodiments. For example, the hinge assembly 500 may include a panel 516a with an opening 546a, an opening 546b, and an opening 546c. The hinge assembly 500 may include a panel 516b having the same number of openings in locations corresponding to the locations of the openings of the panel 516a. These openings represent through holes in the panels, thereby allowing a fastener (not shown in FIG. 11), such as a screw, to pass through each of the openings and secure the hinge assembly 500 to a consumer device (not shown in FIG. 11) at a first location.

Similarly, the hinge assembly 500 may include a panel 516c with an opening 548a, an opening 548b, and an opening 548c. The hinge assembly 500 may include a panel 516d having the same number of openings in locations corresponding to the locations of the openings of the panel 516c. These openings represent through holes in the panels, thereby allowing a fastener (such as screws) to pass through each of the openings and secure the hinge assembly 500 to a consumer device (not shown in FIG. 11) at a second location different from the first location. The openings provide an easily integrated method to secure the hinge assembly 500 with the consumer device.

FIG. 12 illustrates an isometric view of an alternate embodiment of a hinge assembly 600, showing the hinge assembly 600 having panels coupled to additional panels that include openings, in accordance with some described embodiments. The hinge assembly 600 may include a panel 616b. The hinge assembly 600 may further include a panel 652a and a panel 652b coupled to the panel 616b by an adhesive and/or weld, as non-limiting examples. In order to provide a securing means between the hinge assembly 600 and a consumer device (not shown in FIG. 12), the panel 652a may include an opening 646a, and the panel 652b may include an opening 646b. The opening 646a and the opening 646b are designed to receive a fastener (not shown in FIG. 12). Similarly, hinge assembly 600 may include a panel 616d. The hinge assembly 600 may further include a panel 652c and a panel 652d coupled to the panel 616d by an adhesive and/or weld, as non-limiting examples. In order to provide a securing means between the hinge assembly 600 and a consumer device (not shown in FIG. 12), the panel 652c may include an opening 646c, and the panel 652d may include an opening 646d. The opening 646c and the opening 646d are designed to receive a fastener (not shown in FIG. 12). The panels, extending from the larger panels, provide a modification to the hinge assembly 600 in which the securing means is generally outside, or external to, the primary components of the hinge assembly 600.

Referring again to FIG. 11, the hinge assembly 500 includes a friction element 506a and a friction element 506b. As shown, the friction element 506a and the friction element 506b are separated by a space or gap. The remaining friction elements may also include a space or gap between adjacent friction elements. The stiffness (or ability to resist bending) of the parts of the hinge assembly 500 is a function of the space between the friction elements. In order to increase the stiffness of a hinge assembly, a stiffening element, or block, may be positioned between adjacent friction elements. For example, the hinge assembly 600 in FIG. 12 includes a friction element 606a and a friction element 606b. As shown, a stiffening element 656a is positioned in a space between the friction element 606a and the friction element 606b. Additional stiffening elements may be positioned between adjacent friction elements in both a first hinge section 602 of the hinge assembly 600 and a second hinge section 604 of the hinge assembly 600. As a result, the stiffness of the hinge assembly 600 in FIG. 12 may be increased, as compared to the stiffness of the hinge assembly 500 in FIG. 11.

Figure 13:
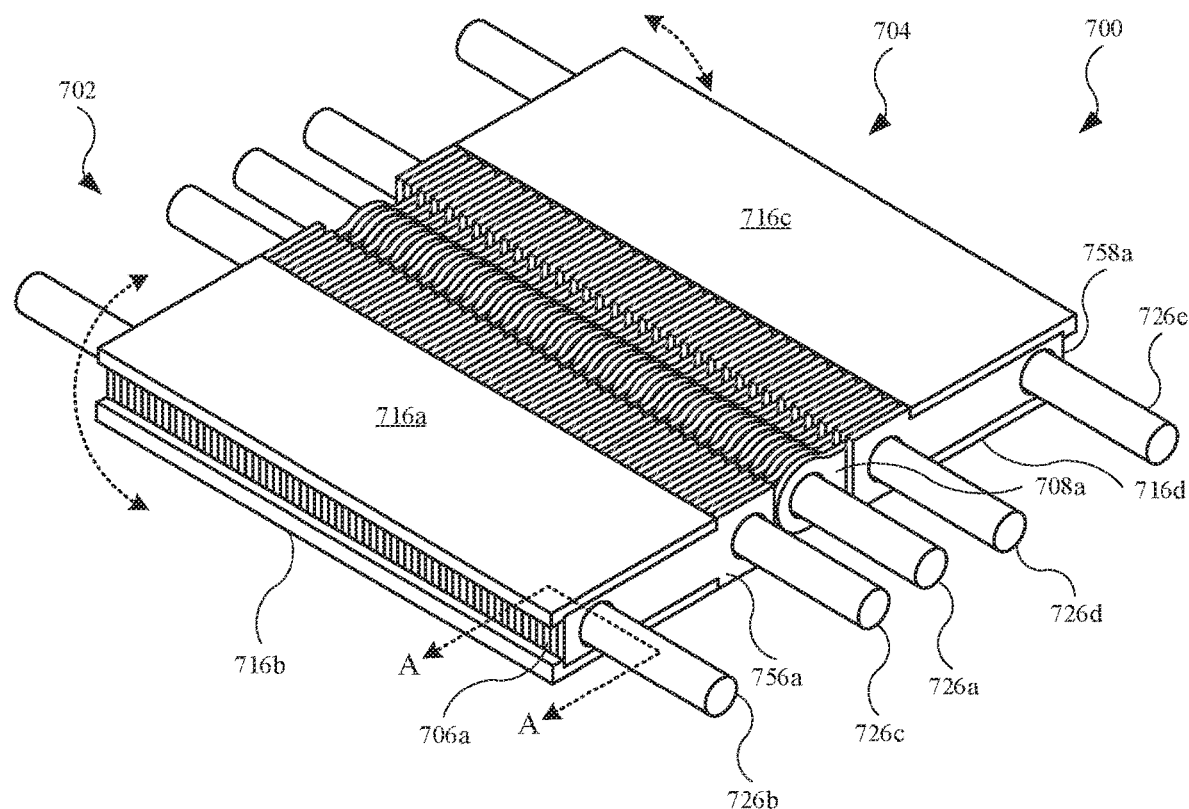
FIG. 13 illustrates an isometric view of an alternate embodiment of a hinge assembly with spacer elements between friction elements, in accordance with some described embodiments.

FIG. 13 illustrates an isometric view of an alternate embodiment of a hinge assembly 700 with spacer elements between friction elements, in accordance with some described embodiments. As shown, the hinge assembly 700 may include several friction elements, such as a friction element 706a and a friction element 708a. The hinge assembly 700 may include a cylindrical element 726a that passes through openings of the friction element 706a and the friction element 708a, as well as the remaining friction elements. Further, the hinge assembly 700 may include several spacer elements, such as a spacer element 756a and a spacer element 758a. The hinge assembly 700 may further include several spacer elements having a design that is similar to that of the spacer element 756a and a spacer element 758a. These spacer elements can be positioned between a pair of friction elements. The spacer elements of the hinge assembly 700 may also provide support to the cylindrical element 726a as well as additional cylindrical elements. This will be further shown below.

As shown, the hinge assembly 700 includes a first hinge section 702 and a second hinge section 704. The first hinge section 702 may include a panel 716a and a panel 716b, and the second hinge section 704 may include a panel 716c and a panel 716d. The hinge assembly 700 may include additional cylindrical elements. For example, the hinge assembly 700 may include a cylindrical element 726b and a cylindrical element 726c that passes through friction elements associated with the first hinge section 702 (such as the friction element 706a). The hinge assembly 700 may include a cylindrical element 726d and a cylindrical element 726e that passes through friction elements associated with the second hinge section 704 (such as the friction element 708a).

The cylindrical element 726a may be referred to as a "main axis shaft" or a "common shaft" as the cylindrical element 726a passes through each friction element of the hinge assembly 700. Also, the first hinge section 702 may rotate relative to the second hinge section 704, or vice versa, about the cylindrical element 726a. Conversely, the cylindrical element 726b and the cylindrical element 726c may be referred to as "outer shafts" of the first hinge section 702, and the cylindrical element 726d and the cylindrical element 726e may be referred to as "outer shafts" of the second hinge section 704. The outer shafts may distribute an applied force to associated friction elements. For example, when a force gradient applied to a first subset of the friction elements of the first hinge section 702, the cylindrical element 726*b* and the cylindrical element 726*c* may distribute the applied force to a remaining second subset of friction elements of the first hinge section 702. The force distribution by the cylindrical element 726*b* and the cylindrical element 726*c* to several additional friction elements may reduce the stress from the applied force directly to the first subset of friction elements. Also, during rotation of the first hinge section 702 about the cylindrical element 726*a*, the cylindrical element 726*b* and the cylindrical element 726*c* may cause the friction elements and the spacer elements to move in unison. The cylindrical element 726*d* and the cylindrical element 726*e* may provide the same functions and features as that of the cylindrical element 726*b* and the cylindrical element 726*c*, respectively.

Unlike prior embodiments, the hinge assembly 700 may not include friction elements that are donut-shaped (such as the friction element 210*a* in FIG. 4). Rather, each friction element may include an engagement surface (or surfaces) as well as an extension (similar to the friction element 306 shown in FIG. 5). As a result, the number of friction elements may be reduced. Also, the friction element 706*a* may be in frictional engagement with the friction element 708*a* as their respective friction engagement surface is in contact with each other.

Figure 14:
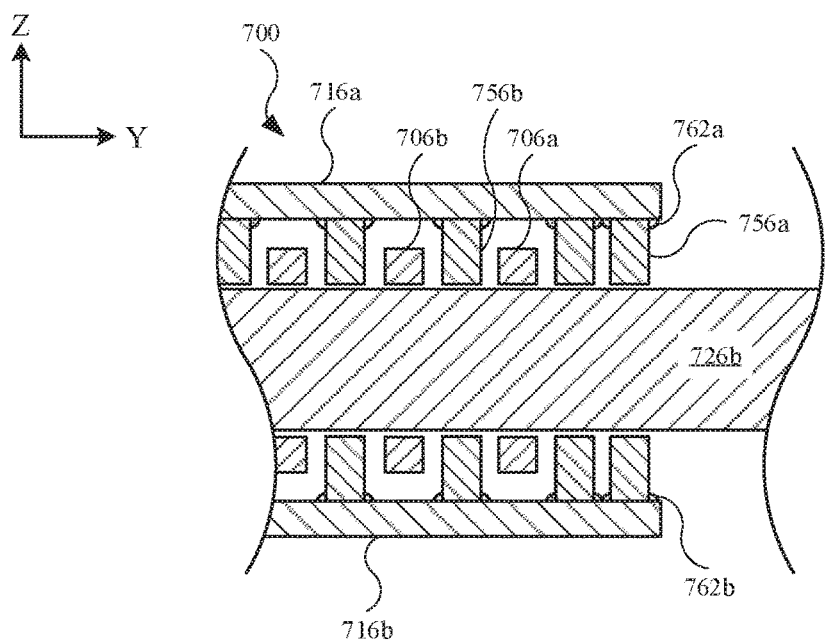
FIG. 14 illustrates a cross sectional view of the hinge assembly shown in FIG. 13, taken along line A-A.

Additional measures may be used to reduce stress on the friction elements. For example, FIG. 14 illustrates a cross sectional view of the hinge assembly 700 shown in FIG. 13, taken along line A-A. As shown, the friction elements and the spacer elements are positioned between the panel 716*a* and the panel 716*b*. However, rather than directly securing the friction elements to the panels, the spacer elements may be secured to the panels. For example, the spacer element 756*a* can be secured to the panel 716*a* and the panel 716*b* by a material 762*a* and a material 762*b*. The material 762*a* and/or a material 762*b* may include an adhesive or a weld. Also, the spacer element 756*a* is longer (in the z-dimension) than that of the friction element 706*a*. As a result, the friction element 706*a* is not in contact with the panel 716*a* and the panel 716*b*, and is not secured to the panel 716*a* and the panel 716*b*. The remaining spacer elements and friction elements of the hinge assembly 700 may include a similar relationship. Also, the friction elements of the hinge assembly 700 are not secured to the cylindrical elements. For example, the friction element 706*a* and the friction element 706*b* are not secured to the cylindrical element 726*b*.

The hinge assembly 700 provides several advantages. For example, by isolating the friction elements from the panels, an applied force exerted on the panels is not directly transmitted to the friction elements, thereby reducing or eliminating unwanted stress to the friction elements. As a result, the function of the friction elements may be limited to serving as the primary friction engine of the hinge assembly 700 and is less susceptible to breakdown from external forces.

The spacer elements can positioned between adjacent friction elements. For example, a spacer element 756*b* is positioned between the friction element 706*a* and the friction element 706*b*. Also, as shown in FIG. 14, the spacer elements are not in contact with the friction elements. As a result, any force incurred by the spacer elements is not directly transmitted to the friction elements. Although FIGS. 13 and 14 show a hinge assembly 700 with a spacer between adjacent friction elements, in some embodiments (not shown) of a hinge assembly, a spacer element is positioned between some, but not all, adjacent pairs of friction elements.

Figure 15:
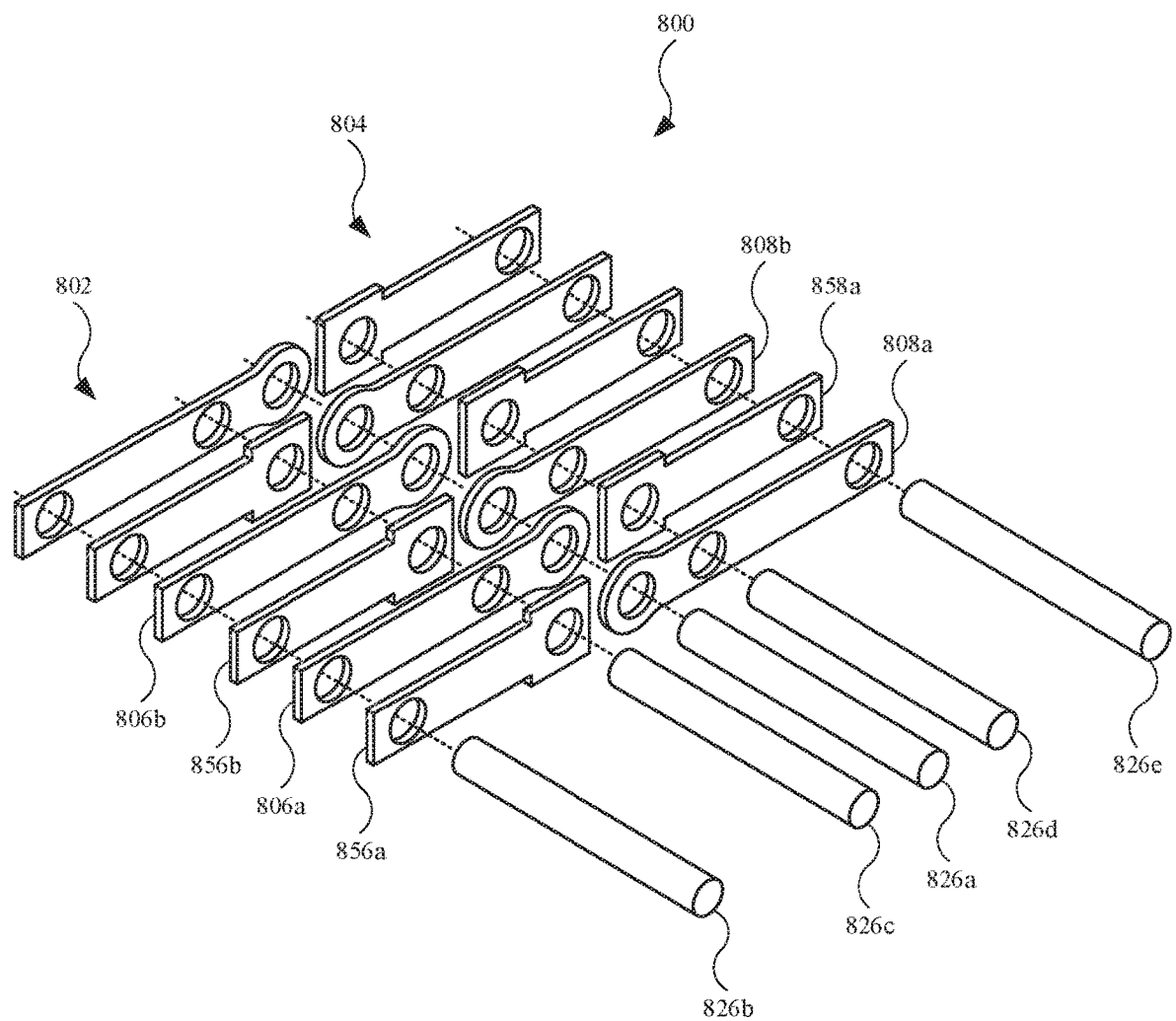
FIG. 15 illustrates an exploded view of an embodiment of a hinge assembly, showing various structural elements of the hinge assembly, in accordance with some described embodiments.

FIG. 15 illustrates an exploded view of an embodiment of a hinge assembly 800, showing various structural elements of the hinge assembly 800, in accordance with some described embodiments. The hinge assembly 800 may include components and features described herein for various embodiments of hinge assemblies. As shown, the hinge assembly 800 may include a spacer element 856*a* aligned with a friction element 808*a*, and a spacer element 858*a* aligned with a friction element 806*a*. Also, the friction elements are separated by a spacer element. For example, the friction element 806*a* is separated from a friction element 806*b* by a spacer element 856*b*. Also, when the hinge assembly 800 is assembled, the friction element 806*a* engages the friction element 808*a* as well as a friction element 808*b*. As a result, the friction element 806*a* is in frictional engagement with the friction element 808*a* and the friction element 808*b*. Also, similar to the prior embodiment, the hinge assembly 800 may exclude donut-shaped friction elements.

The hinge assembly 800 may include multiple cylindrical elements. For example, the hinge assembly 800 may include a cylindrical element 826*a* that passes through each friction element of the hinge assembly 800. The hinge assembly 800 may include a cylindrical element 826*b* and a cylindrical element 826*c* that pass through each friction element and each spacer element associated with a first hinge section 802 of the hinge assembly 800. The hinge assembly 800 may further include a cylindrical element 826*d* and a cylindrical element 826*e* that pass through each friction element and each spacer element associated with a second hinge section 804 of the hinge assembly 800. The friction elements and spacer elements shown and described in FIGS. 13 and 14 may include similar designs and relationships as those of the friction elements and spacer elements, respectively, shown and described in FIG. 15.

Figure 16:
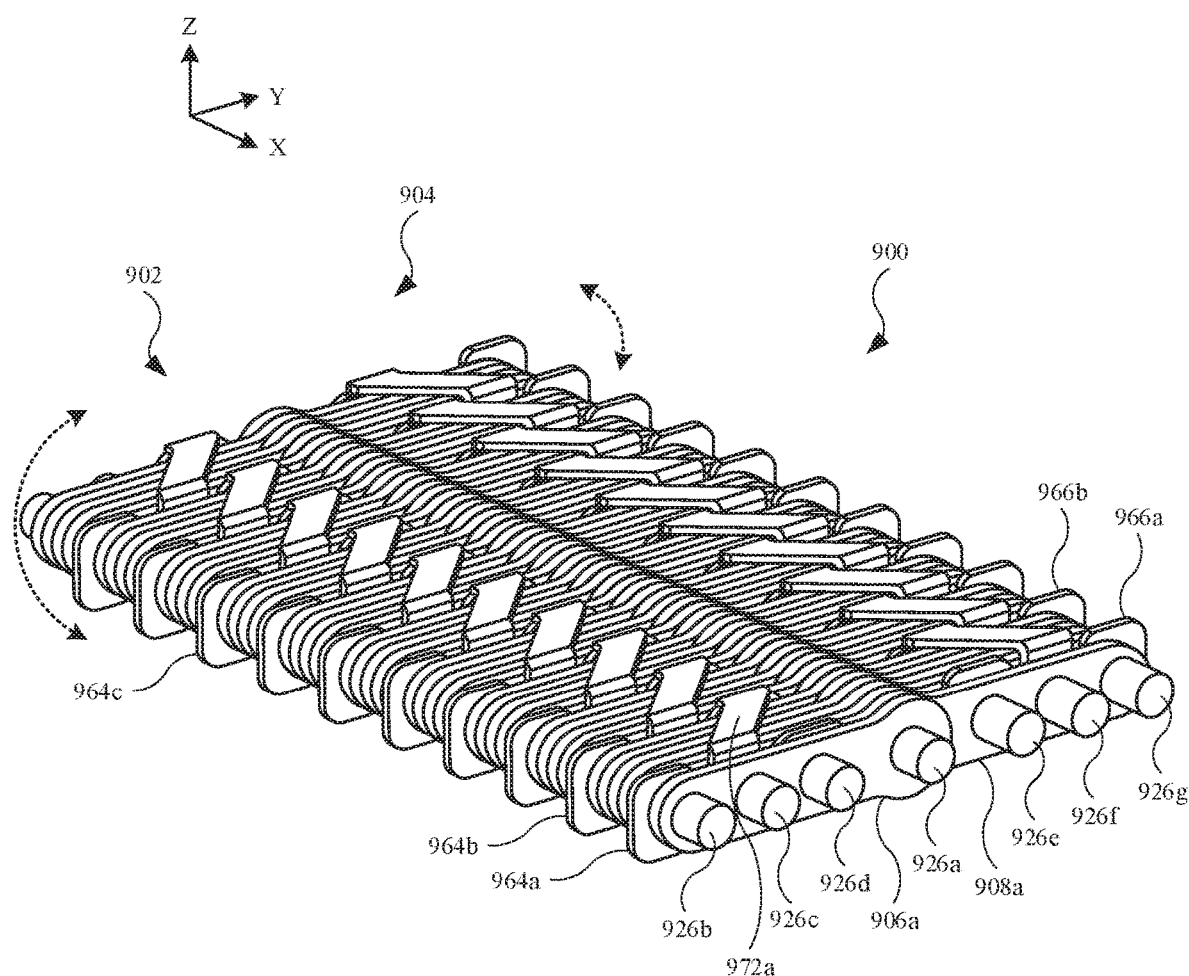
FIG. 16 illustrates an isometric view of an embodiment of a hinge assembly, showing the hinge assembly having several mounting structures designed to align cylindrical elements as well as friction elements, in accordance with some described embodiments.

FIG. 16 illustrates an isometric view of an embodiment of a hinge assembly 900, showing the hinge assembly 900 having several mounting structures designed to align cylindrical elements as well as friction elements, in accordance with some described embodiments. As shown, the hinge assembly 900 may include several friction elements, including a friction element 906*a* that is in frictional engagement with a friction element 908*a*. In order to align the friction elements in a desired manner, the hinge assembly 900 may include several mounting structures. For example, the hinge assembly 900 may include a mounting structure 964*a* designed to align a set friction elements positioned between opposing ends of the mounting structure 964*a*. The hinge assembly 900 may further include a mounting structure 964*b* designed to align an additional set of friction elements positioned between opposing ends of the mounting structure 964*b*. The mounting structure 964*a* and the mounting structure 964*b* may be associated with a first hinge section 902 of the hinge assembly 900. The hinge assembly 900 may include a mounting structure 966*a* designed to align a set friction elements positioned between opposing ends of the mounting structure 966*a*. The hinge assembly 900 may further include a mounting structure 966*b* designed to align an additional set of friction elements positioned between opposing ends of the mounting structure 966*b*. The mounting structure 966*a* and the mounting structure 966*b* may be associated with a second hinge section 904 of the hinge assembly 900. Also, although not shown in FIG. 16, one or more panels (similar to the panel 116*a* in FIG. 1) can secure to the mounting structures, as the mounting structures can be adapted to carry the panels. For example, the mounting structure 964a includes a bridge 972a that is positioned over several friction elements. Moreover, the mounting structure 964a is longer (in the z-dimension) as compared to that of the friction element 906a, which prevents engagement between a panel or consumer device and the friction elements. The remaining mounting structures may include similar features and dimensions as those described for the mounting structure 964a.

The hinge assembly 900 may further include several cylindrical elements. For example, the hinge assembly 900 may include a cylindrical element 926a that passes through each friction element of the hinge assembly 900. The hinge assembly 900 may include a cylindrical element 926b, a cylindrical element 926c, and a cylindrical element 926d that pass through each friction element and each mounting structure associated with the first hinge section 902. The hinge assembly 900 may further include a cylindrical element 926e, a cylindrical element 926f, and a cylindrical element 926g that pass through each friction element and each mounting structure associated with the second hinge section 904. The use of additional cylindrical elements provides additional stiffness against bending stresses.

In addition to aligning the friction elements, the mounting structures may provide several advantages. For example, the mount structures may include a modular design. In other words, the mounting structure 964a may be separate from the mounting structure 964b. The modular design may isolate the friction elements from an external force to the hinge assembly 900 to a particular location, and may prevent remaining location from damage or other undesired effects. For example, a force to the mounting structure 964a is isolated from a mounting structure 964c as well as friction elements that are surrounded by the mounting structure 964b.

Figure 17:
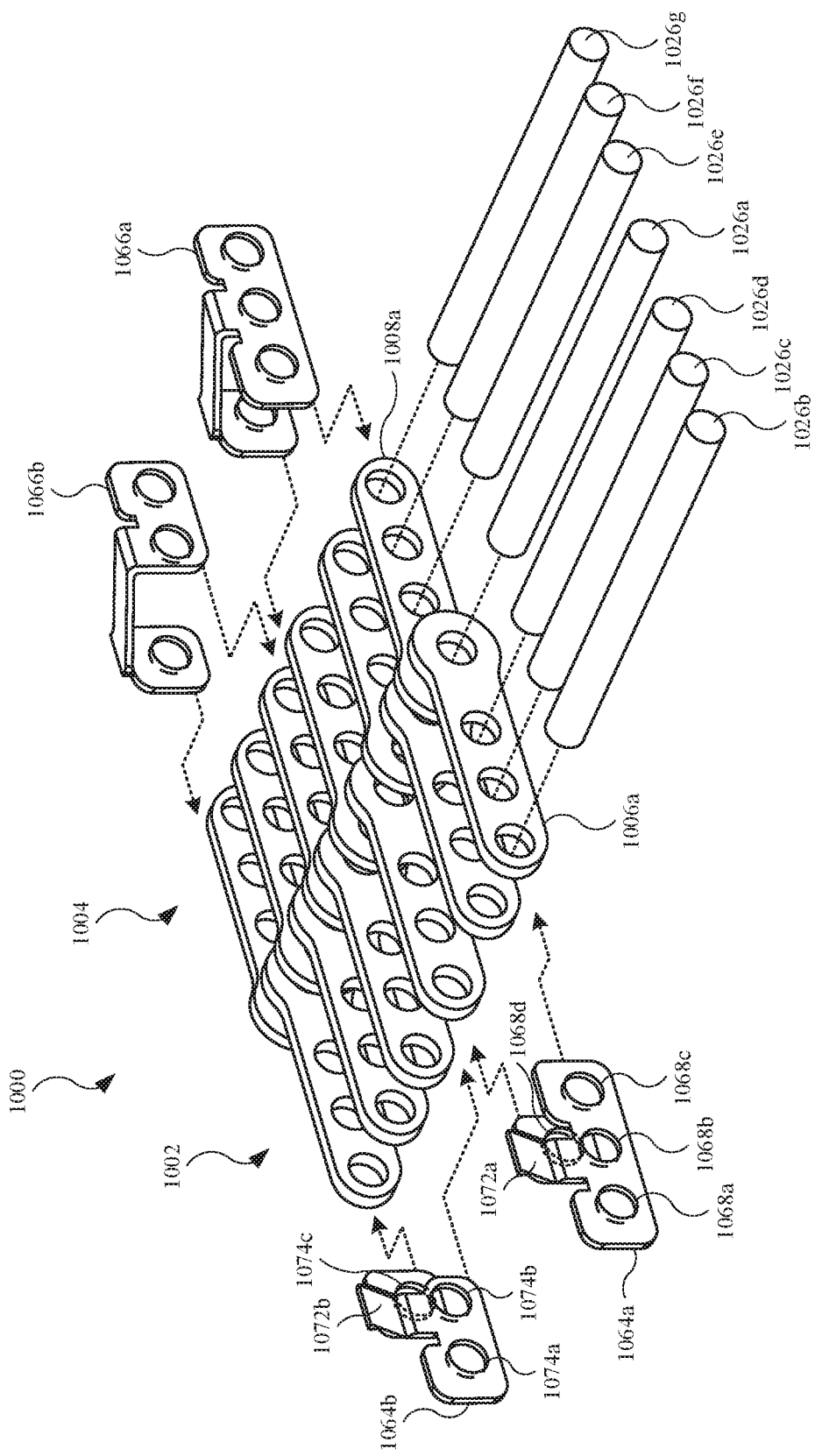
FIG. 17 illustrates an exploded view of an embodiment of a hinge assembly, showing various structural elements of the hinge assembly, in accordance with some described embodiments.

FIG. 17 illustrates an exploded view of an embodiment of a hinge assembly 1000, showing various structural elements of the hinge assembly 1000, in accordance with some described embodiments. As shown, the hinge assembly 1000 may include several friction elements, including a friction element 1006a that is in frictional engagement with a friction element 1008a when the hinge assembly 1000 is assembled. In order to align the friction elements in a desired manner, the hinge assembly 1000 may include several mounting structures. For example, the hinge assembly 1000 may include a mounting structure 1064a designed to align a set friction elements positioned between opposing ends of the mounting structure 1064a. The hinge assembly 1000 may further include a mounting structure 1064b designed to align an additional set of friction elements positioned between opposing ends of the mounting structure 1064b. The mounting structure 1064a and the mounting structure 1064b may be associated with a first hinge section 1002 of the hinge assembly 1000. The hinge assembly 1000 may include a mounting structure 1066a designed to align a set friction elements positioned between opposing ends of the mounting structure 1066a. The hinge assembly 1000 may further include a mounting structure 1066b designed to align an additional set of friction elements positioned between opposing ends of the mounting structure 1066b. The mounting structure 1066a and the mounting structure 1066b may be associated with a second hinge section 1004 of the hinge assembly 1000.

The hinge assembly 1000 may further include several cylindrical elements. For example, the hinge assembly 1000 may include a cylindrical element 1026a that passes through each friction element of the hinge assembly 1000. The hinge assembly 1000 may include a cylindrical element 1026b, a cylindrical element 1026c, and a cylindrical element 1026d that pass through each friction element and each mounting structure associated with the first hinge section 1002. The hinge assembly 1000 may further include a cylindrical element 1026e, a cylindrical element 1026f, and a cylindrical element 1026g that pass through each friction element and each mounting structure associated with the second hinge section 1004.

For the cylindrical elements to pass through the mounting structures, the mounting structures may include multiple openings, or through holes, with each opening have a size and shape to receive a cylindrical element. For example, the mounting structure 1064a includes an opening 1068a, an opening 1068b, and an opening 1068c designed to receive the cylindrical element 1026b, the cylindrical element 1026c, and the cylindrical element 1026d, respectively. The mounting structure 1064a may further include an opening 1068d designed to receive the cylindrical element 1026d. The mounting structure 1064a may further include a bridge 1072a that connects different sections of the mounting structure 1064a. The dimensions of bridge 1072a generally dictate the number of friction elements that are surrounded by the mounting structure 1064a when the hinge assembly 1000 is assembled. While the bridge 1072a is designed such that the mounting structure 1064a surrounds three friction elements, as shown in FIG. 17, the bridge 1072a can be modified such that the mounting structure 1064a surrounds a different number of friction elements.

The mounting structure 1064b includes an opening 1074a and an opening 1074b designed to receive the cylindrical element 1026b and the cylindrical element 1026c, respectively. The mounting structure 1064b may further include an opening 1074c designed to receive the cylindrical element 1026d. The mounting structure 1064b may further include bridge 1702a that connects different sections of the mounting structure 1064a. While the bridge 1072b is designed such that the mounting structure 1064b surrounds three friction elements, as shown in FIG. 17, the bridge 1072b can be modified such that the mounting structure 1064b surrounds a different number of friction elements. The mounting structure 1066a and the mounting structure 1066b may include similar design features as that of the mounting structure 1064a and the mounting structure 1064b, respectively. Also, the hinge assembly 900 shown and described in FIG. 16 may include any components, including features and designs of the components, described for the hinge assembly 1000 in FIG. 17.

Figure 18:
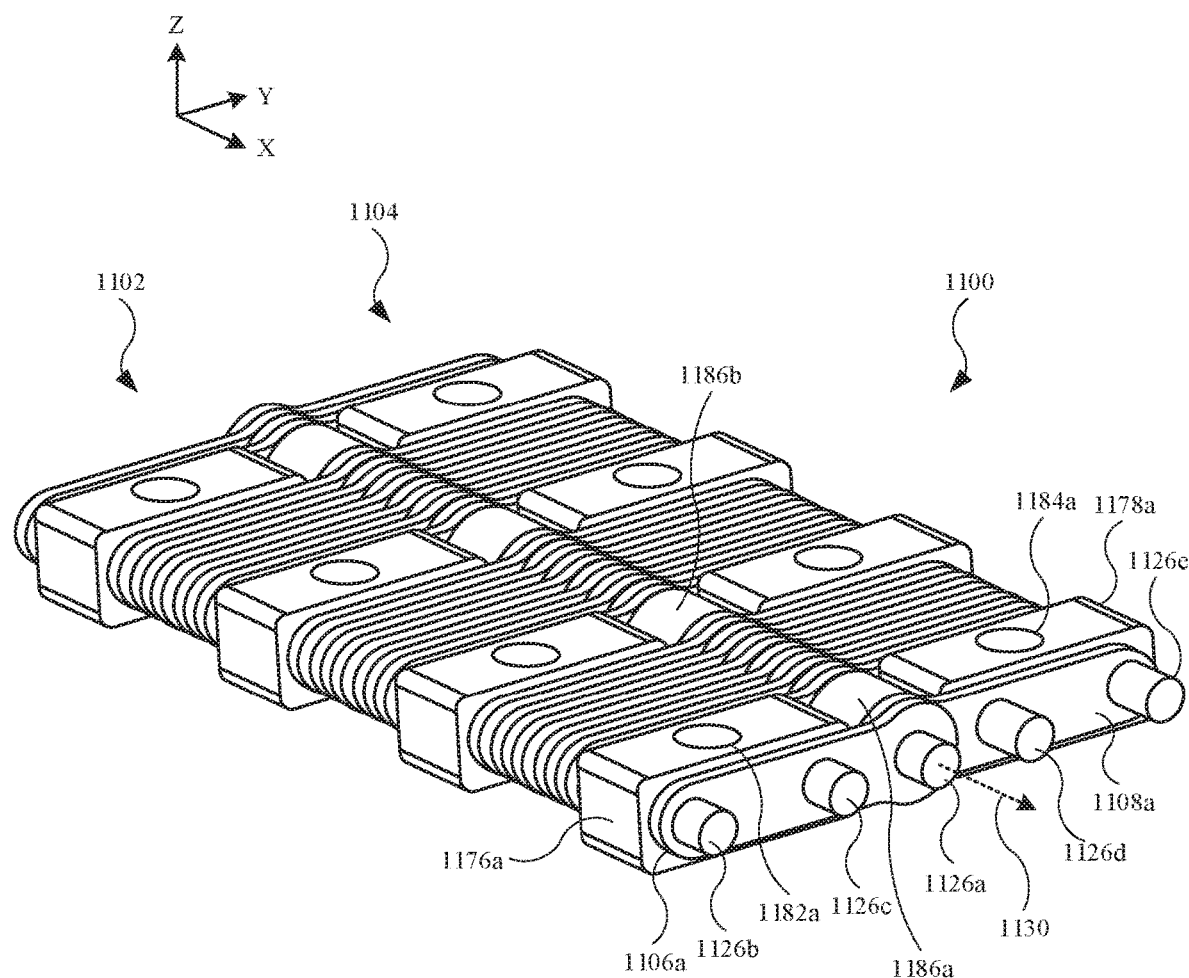
FIG. 18 illustrates an isometric view of an embodiment of a hinge assembly, showing the hinge assembly having several mounting blocks and spacing elements designed to align cylindrical elements as well as friction elements, in accordance with some described embodiments.

FIG. 18 illustrates an isometric view of an embodiment of a hinge assembly 1100, showing the hinge assembly 1100 having several mounting blocks and spacing elements designed to align cylindrical elements as well as friction elements, in accordance with some described embodiments. As shown, the hinge assembly 1100 may include several friction elements, including a friction element 1106a and a friction element 1108a in frictional engagement with the friction element 1106a. The hinge assembly 1100 may further include several mounting blocks designed to provide structural support as well as a means for securing the hinge assembly 1100 to a consumer device (not shown in FIG. 18). For example, the hinge assembly 1100 may include a mounting block 1176a and a mounting block 1178a. Further, the mounting block 1176a may include an opening 1182a, or through hole, and the mounting block 1178a may include an opening 1184a, or through hole. The hinge assembly 1100 may include fasteners (not shown in FIG. 18) passing through the hinge assembly 1100 via the openings (such as the opening 1182a and the opening 1184a). The mounting blocks may be longer (in the z-dimension) than that of the friction elements in order to isolate the friction elements from panels (not shown in FIG. 18) connected to the mounting blocks, or to isolate the friction elements from the consumer device.

The hinge assembly 1100 may further include several spacing elements. For example, the hinge assembly 1100 includes a spacing element 1186a and a spacing element 1186b. The spacing elements may include a cylindrical body designed to provide a compression force along an axial axis 1130 defined by a cylindrical element 1126a. In this manner, the spacing elements may increase the force (normal to the friction elements) along the axial axis 1130, thereby increasing the torque require to rotate the friction elements of the hinge assembly 1100. As shown, the spacing elements may be aligned with the mounting blocks (along the y-dimension, for example).

The cylindrical element 1126a may pass through an opening of each friction element and each spacer element in FIG. 18. The hinge assembly 1100 may further include additional cylindrical elements. For example, the hinge assembly 1100 may include a cylindrical element 1126b and a cylindrical element 1126c that pass through each friction element and each mounting block associated with a first hinge section 1102 of the hinge assembly 1100. The hinge assembly 1100 may further include a cylindrical element 1126d and a cylindrical element 1126e that pass through each friction element and each mounting block associated with a second hinge section 1104 of the hinge assembly 1100.

Figure 19:
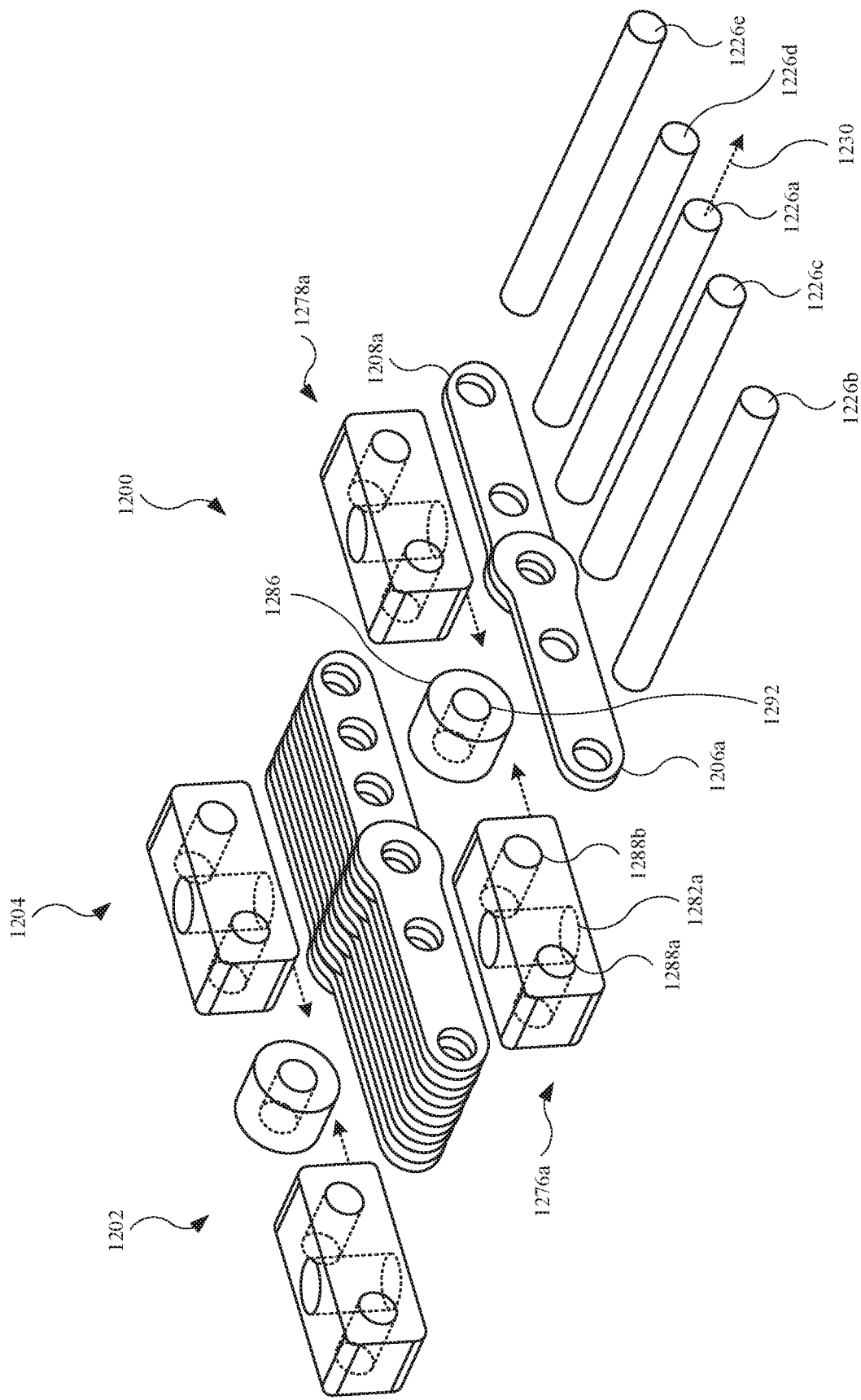
FIG. 19 illustrates an exploded view of an embodiment of a hinge assembly, showing various structural elements of the hinge assembly, in accordance with some described embodiments.

FIG. 19 illustrates an exploded view of an embodiment of a hinge assembly 1200, showing various structural elements of the hinge assembly, in accordance with some described embodiments. The hinge assembly 1200 may include components and features described herein for a hinge assembly, particularly the hinge assembly 1200 (shown in FIG. 18). As shown, the hinge assembly 1200 may include several friction elements, including a friction element 1206a and a friction element 1208a. The hinge assembly 1200 may further include several mounting blocks, such as a mounting block 1276a and a mounting block 1278a. Each mounting block may include multiple openings, or through holes. For example, the mounting block 1276a may include an opening 1282a, or through hole, designed to receive a fastener (not shown in FIG. 19). The 1276a may include an opening 1288a and an opening 1288b designed to receive a cylindrical element 1226b and a cylindrical element 1226c, respectively.

The hinge assembly 1200 may further include several spacing elements, such as a spacing element 1286. The spacing elements may include a cylindrical body designed to provide a compression force along an axial axis 1230 defined by a cylindrical element 1226a. In this manner, the spacing elements may increase the force (normal to the friction elements) along the axial axis 1230, thereby increasing the torque require to rotate the friction elements of the hinge assembly 1200. The spacing element 1286 may include an opening 1292 designed to receive the cylindrical element 1226a when the hinge assembly 1200 is assembled.

The cylindrical element 1226a may pass through an openings of each friction element and each spacer element in FIG. 19. The hinge assembly 1200 may further include additional cylindrical elements. For example, the hinge assembly 1200 may include a cylindrical element 1226b and a cylindrical element 1226c that pass through each friction element and each mounting block associated with a hinge section 1202 of the hinge assembly 1200. The hinge assembly 1200 may further include a cylindrical element 1226d and a cylindrical element 1226e that pass through each friction element and each mounting block associated with a second hinge section 1204 of the hinge assembly 1200.

Figure 20:
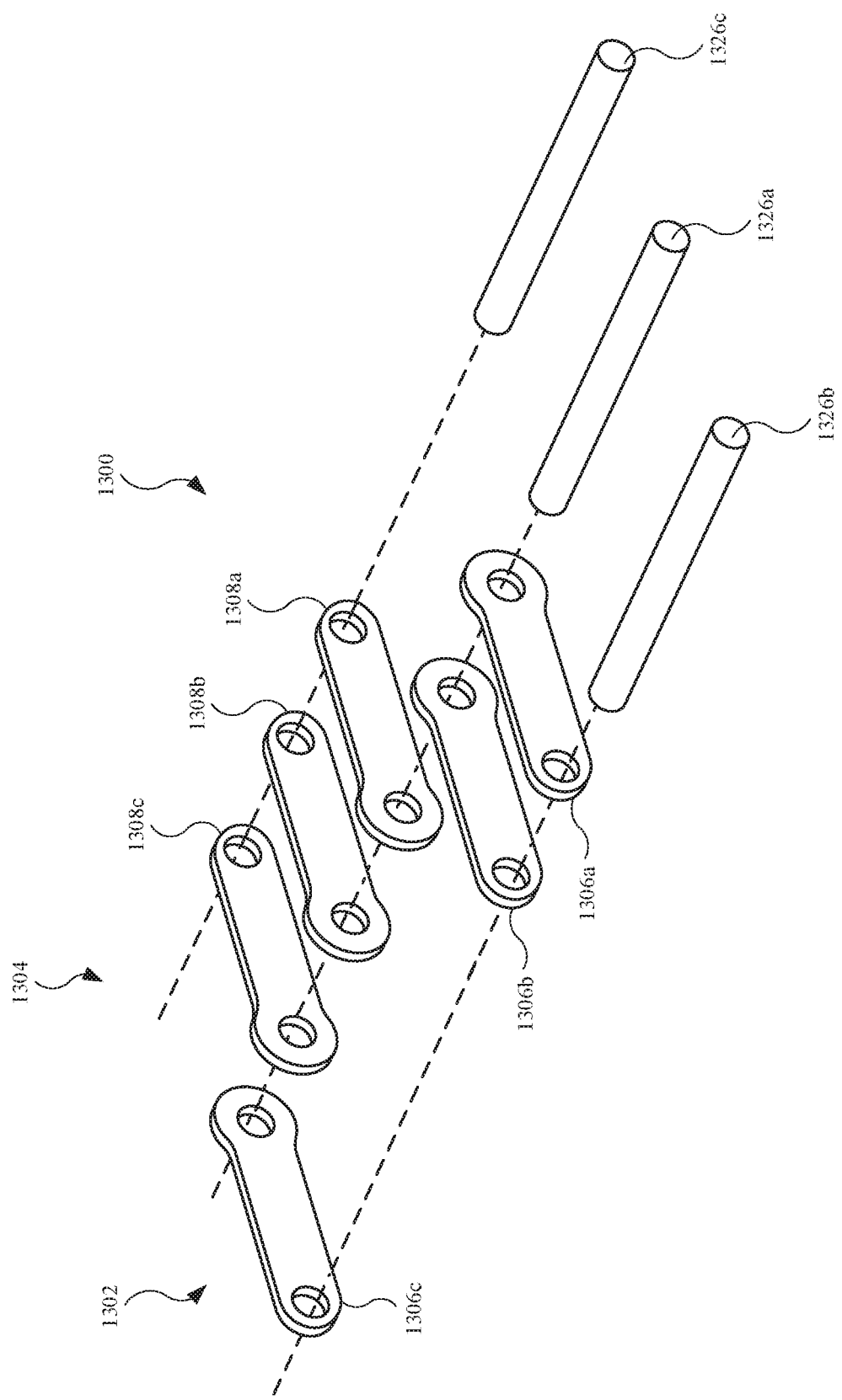
FIG. 20 illustrates an exploded view of an embodiment of a hinge assembly, showing several friction elements and cylindrical elements of the hinge assembly, in accordance with some described embodiments.

The prior embodiments of a hinge assembly include a particular order of friction elements. For example, given a first friction element associated with a first hinge section, a consecutive second friction element (or friction element in contact with the first friction element) is associated with a second hinge section. However, some embodiments of a hinge assembly may include a non-ordered pair (or pairs) of friction elements. For example, FIG. 20 illustrates an exploded view of an embodiment of a hinge assembly 1300, showing several friction elements and cylindrical elements of the hinge assembly 1300, in accordance with some described embodiments. The hinge assembly 1300 may include a friction element 1306a and a friction element 1308a associated with a first hinge section 1302 and a second hinge section 1304, respectively, of the hinge assembly 1300. The hinge assembly 1300 may further include a friction element 1306b and a friction element 1306c, each of which is associated with the first hinge section 1302. The hinge assembly 1300 may further include a friction element 1308b and a friction element 1308c, each of which is associated with the second hinge section 1304. Also, the hinge assembly 1300 may include a cylindrical element 1326a, a cylindrical element 1326b, and a cylindrical element 1326c, each of which is designed to pass through at least some openings of the friction elements.

The friction element 1306a and the friction element 1306b represent a pair of consecutive friction elements in the first hinge section 1302, while the friction element 1308a, the friction element 1308b, and a friction element 1308c represent three consecutive friction elements in the second hinge section 1304. Further, the friction element 1306c may represent an unpaired friction element in the first hinge section 1302. Accordingly, the hinge assembly 1300 may provide friction elements that are assembled without a particular order. Also, in some instances, consecutive fractioned are secured together by adhesives and/or welding, as non-limiting examples. In this regard, the friction element 1308b can be welded to the friction element 1308a and the friction element 1308c. This may promote friction elements moving in unison as well as structural stiffness of the hinge assembly 1300.

Figure 21:
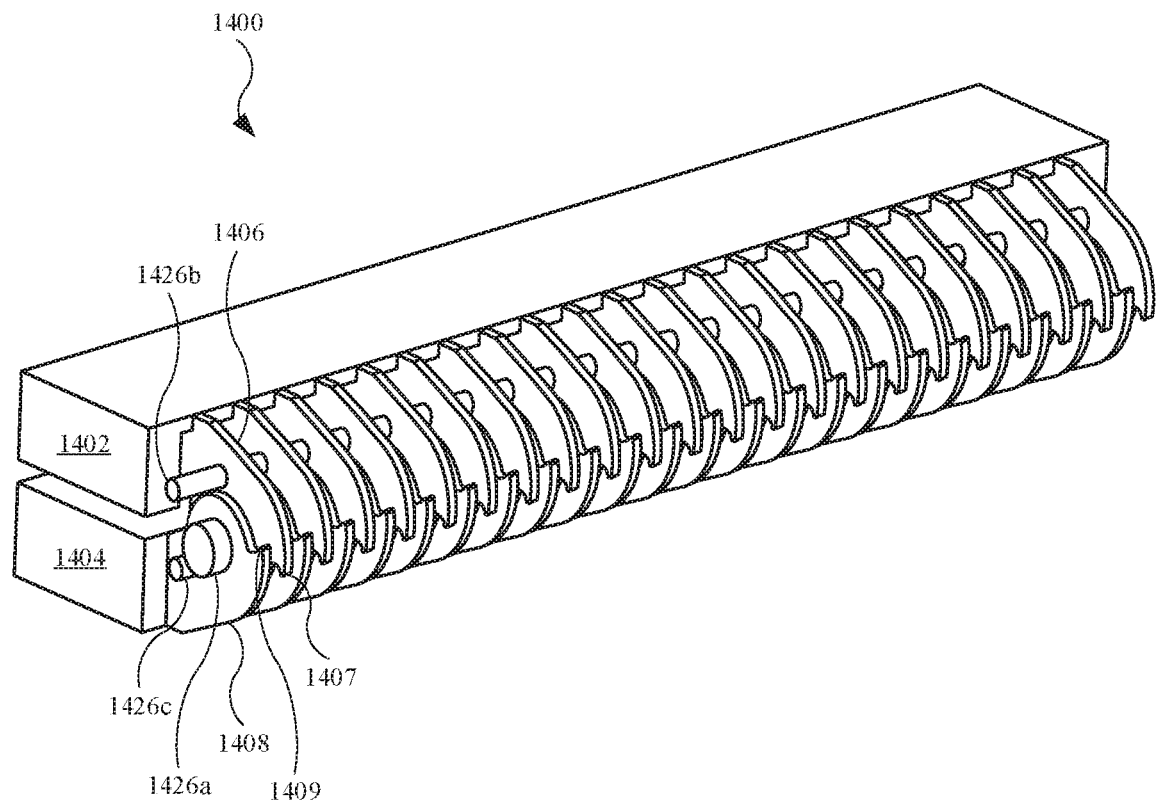
FIG. 21 illustrates an isometric view of an embodiment of a hinge assembly, showing the hinge assembly having an integrated mechanical stop, in accordance with some described embodiments.

FIG. 21 illustrates an isometric view of an embodiment of a hinge assembly 1400, showing the hinge assembly 1400 having an integrated mechanical stop, in accordance with some described embodiments. The hinge assembly 1400 may include components and features described herein for a hinge assembly. As shown, the hinge assembly 1400 may include several friction elements, including a friction element 1406 and a friction element 1408 in frictional engagement with the friction element 1406. The friction element 1406 is associated with a first hinge section 1402 of the hinge assembly 1400, and the friction element 1408 is associated with a second hinge section 1404 of the hinge assembly 1400. The hinge assembly 1400 may further include a cylindrical element 1426a that passes through an opening of the friction element 1406 and the friction element 1408, as well as respective openings of each additional friction element. The hinge assembly 1400 may include a cylindrical element 1426b that passes through an opening of each friction element associated with the first hinge section 1402. The hinge assembly 1400 may include a cylindrical element 1426*b* that passes through an opening of each friction element associated with the second hinge section 1404.

In order to provide the integrated mechanical stop, the friction elements can be modified to engage at least one of the cylindrical elements. For example, the friction element 1406 may include a hook 1407, which may define a recess in the friction element 1406. The first hinge section 1402 is designed to rotate with respect to the second hinge section 1404 until the hook 1407 engages the cylindrical element 1426*c*, at which point the first hinge section 1402 is prevented from further rotation. The remaining friction elements of the first hinge section 1402 may also engage the cylindrical element 1426*c*. Conversely, the friction element 1408 may include a hook 1409, which may define a recess in the friction element 1408. The second hinge section 1404 is designed to rotate with respect to the first hinge section 1402 until the hook 1409 engages the cylindrical element 1426*b*, at which point the second hinge section 1404 is prevented from further rotation. The remaining friction elements of the second hinge section 1404 may also engage the cylindrical element 1426*b*. Using cylindrical elements and modified friction elements, the integrated stop mechanism of the hinge assembly 1400 may limit rotation of the hinge sections to predetermined angles, based in part on the location of the cylindrical elements as well as the design modification of the friction elements. Having a dedicated stop mechanism integrated into the hinge assembly 1400 may prevent unwanted wear to components, such as the cylindrical element 1426*a*.

Figure 22:
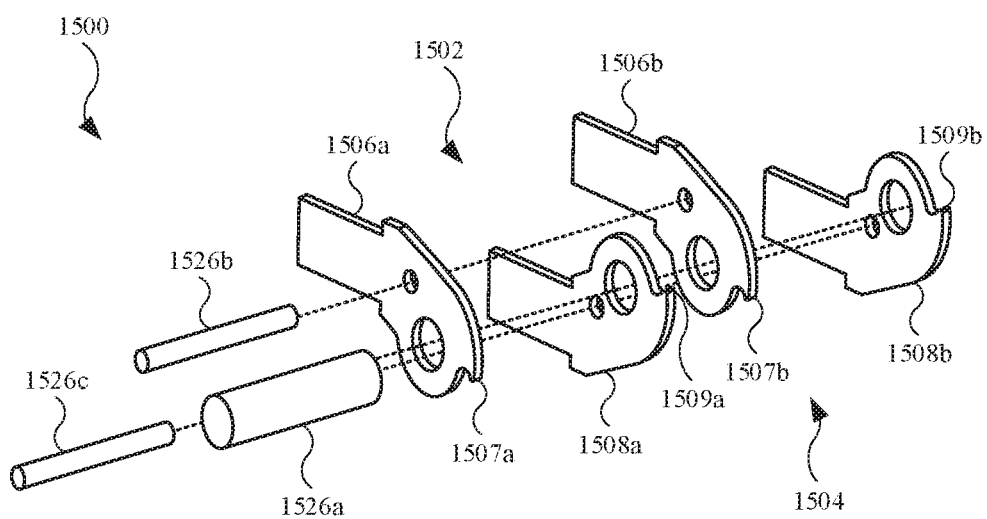
FIG. 22 illustrates an exploded view of an embodiment of a hinge assembly, showing various structural elements of the hinge assembly, in accordance with some described embodiments.

FIG. 22 illustrates an exploded view of an embodiment of a hinge assembly 1500, showing various structural elements of the hinge assembly, in accordance with some described embodiments. The hinge assembly 1500 may include components and associated features of hinge assemblies described herein, including the hinge assembly 1400 (shown in FIG. 21). As shown, the hinge assembly 1500 may include several friction elements, including a friction element 1506*a*, a friction element 1506*b*, a friction element 1508*a*, and a friction element 1508*b*. The hinge assembly 1500 may further include a cylindrical element 1526*a* that passes through an opening of the each of the friction elements. The hinge assembly 1500 may include a cylindrical element 1526*b* that passes through an opening of each friction element associated with the first hinge section 1502. The hinge assembly 1500 may include a cylindrical element 1526*b* that passes through an opening of each friction element associated with the second hinge section 1504.

The friction element 1506*a* and the friction element 1506*b* may include a hook 1507*a* and a hook 1507*b*, respectively, designed to engage the friction element 1526*c* when the friction element 1506*a* and the friction element 1506*b* are sufficiently rotated about the cylindrical element 1526*a*. Conversely, the friction element 1508*a* and the friction element 1508*b* may include a hook 1509*a* and a hook 1509*b*, respectively, designed to engage the cylindrical element 1526*b* when the friction element 1508*a* and the friction element 1508*b* are sufficiently rotated about the cylindrical element 1526*a*. Accordingly, the hinge assembly 1500 may provide an integrated mechanical stop when implemented into a consumer device (not shown in FIG. 22), thereby limiting movement of housing parts or sections of the consumer device.

Figure 23:
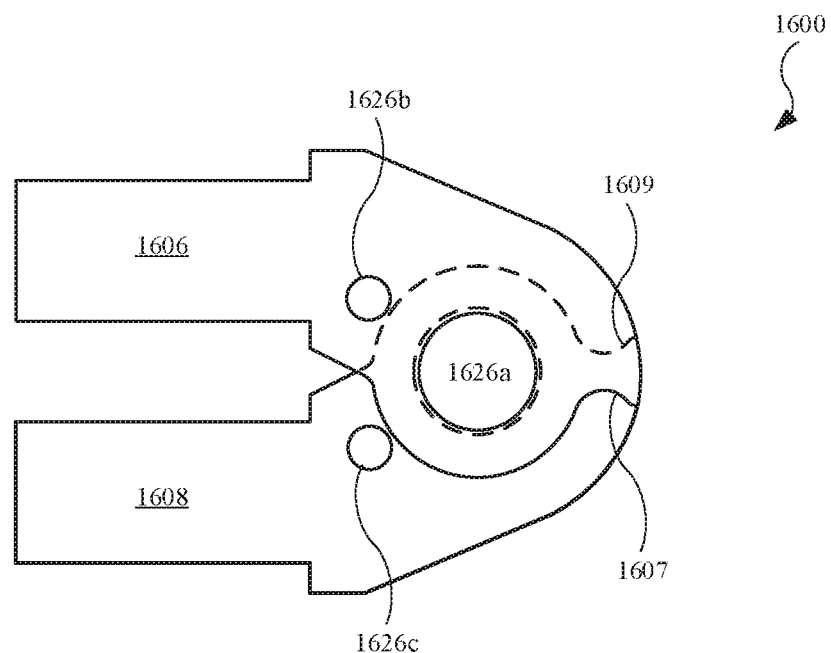
FIG. 23 illustrates a plan view of an embodiment of a hinge assembly, showing friction elements that provide an integrated mechanical stop, in accordance with some described embodiments.

FIG. 23 illustrates a plan view of an embodiment of a hinge assembly 1600, showing friction elements that provide an integrated mechanical stop, in accordance with some described embodiments. As shown, the hinge assembly 1600 may include a friction element 1606 and a friction element 1608 engaged with the friction element 1606, with the friction element 1606 having a hook 1607 and the friction element 1608 having a hook 1609. The hinge assembly 1600 may further include a cylindrical element 1626*a* that passes through an opening of the friction element 1606 and the friction element 1608. The hinge assembly 1600 may further include a cylindrical element 1626*b* that through passes an opening of the friction element 1606. The hinge assembly 1600 may further include a cylindrical element 1626*c* that passes through the friction element 1608. Although not shown, the hinge assembly 1600 may include additional friction elements design features similar to those of the friction element 1606 and the friction element 1608. When the hinge assembly 1600 is integrated into a consumer device, the hinge assembly 1600 may place a pair of housing parts, or a pair of sections, in a closed position or an open position, based upon the relative positions of the friction elements. For example, FIG. 23 shows the hinge assembly 1600 in the closed position, which may position one housing part over (or adjacent to) another housing part.

Figure 24:
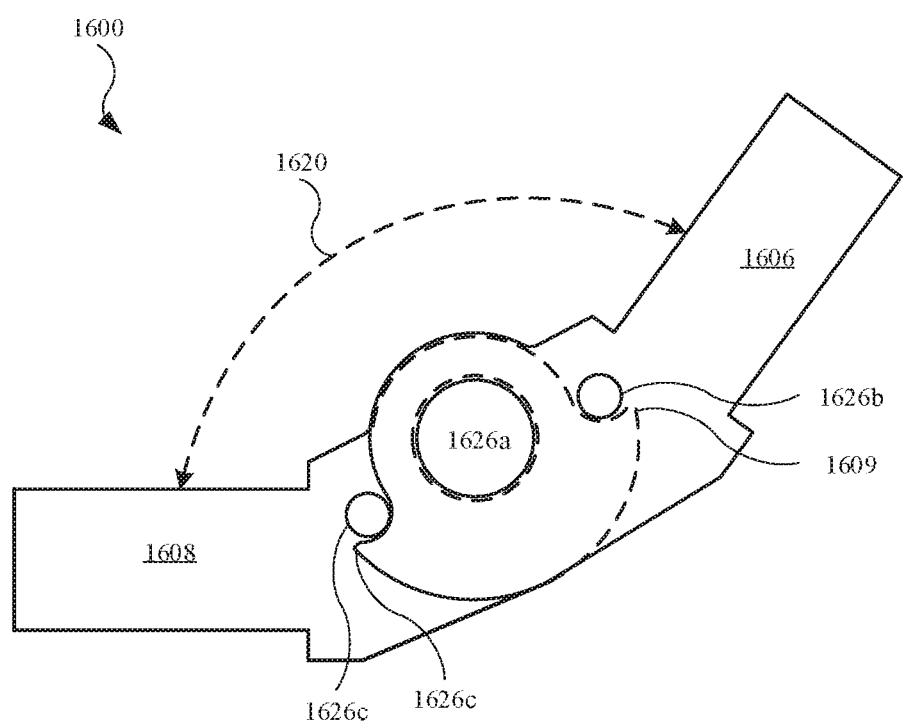
FIG. 24 illustrates a plan view of the hinge assembly shown in FIG. 23, showing a friction element rotated with respect to another friction element.

FIG. 24 illustrates a plan view of the hinge assembly 1600 shown in FIG. 23, showing the friction element 1606 rotated with respect to the friction element 1608. As shown, the friction element 1606 is rotated about the cylindrical element 1626*a*, and relative to the friction element 1608, such that the hook 1607 of the friction element 1606 engages the cylindrical element 1626*c*, thereby preventing the friction element 1606 from further rotation. Further, the friction element 1608 is rotated such that the hook 1609 of the friction element 1608 engages the cylindrical element 1626*b*. The engagement between the hooks and the cylindrical element prevents relative movement of the friction element 1606 and the friction element 1608. The hinge assembly 1600, as shown in FIG. 24, can place a consumer device (not shown in FIG. 24) in an open position, which may position one housing part away from another housing part. The "open position" may define a separation of the housing parts by a predetermined separation angle, based in part on the design of the friction elements and the position of the cylindrical elements. For example, an angle of separation 1620 between the friction element 1606 and the friction element 1608 (which may also represent the angle of separation between two housing parts or two sections of a consumer device) can be approximately in the range of 90 to 150 degrees. The hinge assembly 1600 shown in FIGS. 23 and 24 may provide an exemplary illustration of the movement of the hinge assembly 1400 (shown in FIG. 21) and the hinge assembly 1500 (shown in FIG. 22).

Figure 25:
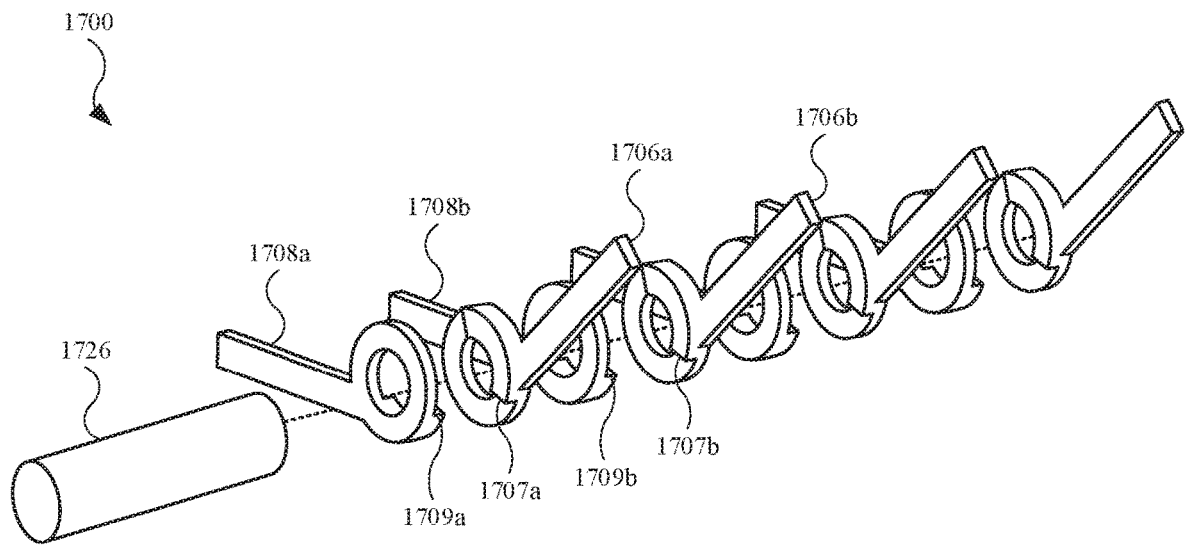
FIG. 25 illustrates an exploded view of an embodiment of a hinge assembly, showing a cylindrical element and several friction element having an integrated mechanical stop, in accordance with some described embodiments.

In some instances, the friction elements can be modified to engage each other to provide an integrated mechanical stop to a hinge assembly, as opposed to incorporating additional cylindrical elements. For example, FIG. 25 illustrates an exploded view of an embodiment of a hinge assembly 1700, showing a cylindrical element 1726 and several friction elements having an integrated mechanical stop, in accordance with some described embodiments. As shown, the hinge assembly 1700 may include a friction element 1706*a*, a friction element 1706*b*, a friction element 1708*a*, and a friction element 1708*b*. The friction element 1706*a* and the friction element 1706*b* may include a ledge 1707*a* and a ledge 1707*b*, respectively. Also, the friction element 1708*a* and the friction element 1708*b* may include a ledge 1709*a* and a ledge 1709*b*, respectively. As shown, the hinge assembly 1700 includes additional friction elements (not labeled). The hinge assembly 1700 may further include a cylindrical element 1726 that passes through respective an opening of each friction element.

In certain configuration, the ledges of the friction elements engage each other and provide the hinge assembly 1700 with an integrated mechanical stop. For example, the friction element 1706*a* may rotate about the cylindrical element 1726, and relative to the friction element 1708*a*, such that the ledge 1707*a* of the friction element 1706*a* engages the ledge 1709*a* of the friction element 1708*a*. Similarly, the friction element 1706*b* may rotate (in unison with the friction element 1706*a*) about the cylindrical element 1726, and relative to the friction element 1708*a*, such that the ledge 1707*b* of the friction element 1706*b* engages the ledge 1709*b* of the friction element 1708*b*. The engagement between the ledges provides the integrated mechanical stop, thereby preventing additional rotational movement of the friction elements. The remaining friction elements may include ledges designed for engagement in a manner previously described. The hinge assembly 1700 of FIG. 25 requires a single cylindrical element while also incorporating an integrated mechanical stop. In this manner, the number of parts of the hinge assembly 1700 may be reduced as additional cylindrical elements are not required for the integrated mechanical stop. This may also reduce the design complexity of the hinge assembly 1700.

Figure 26:
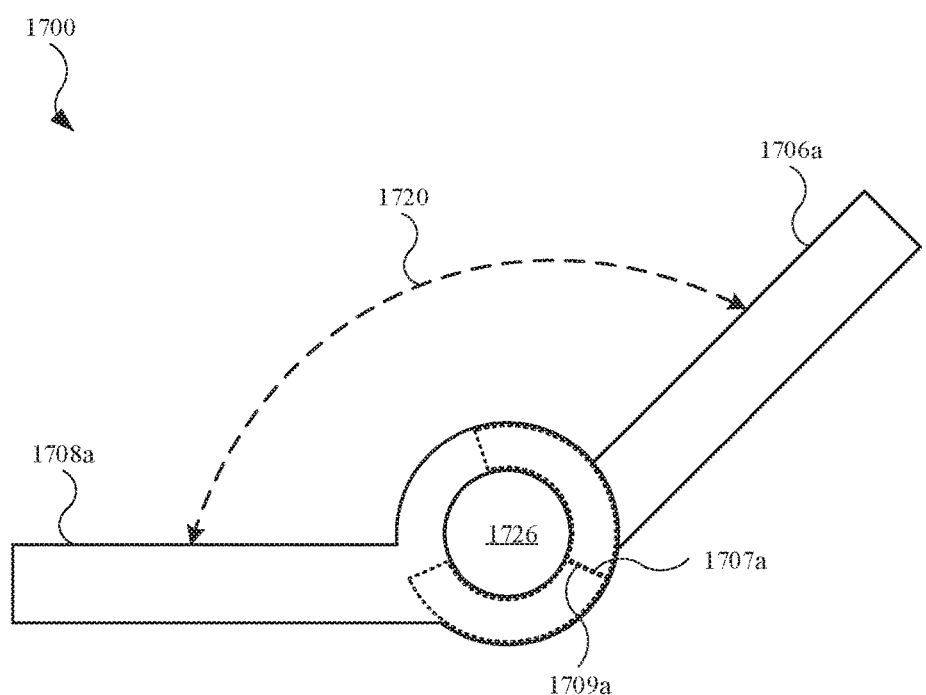
FIG. 26 illustrates a plan view of the hinge assembly shown in FIG. 25, showing the friction elements engaged with each other.

FIG. 26 illustrates a plan view of the hinge assembly 1700 shown in FIG. 25, showing the friction elements engaged with each other. As shown, the ledge 1707*a* of the friction element 1706*a* is engaged with the ledge 1709*a* of the friction element 1708*a*. As a result of the integrated mechanical stop from the engagement between the ledges, the friction element 1706*a* is prevented from further clockwise rotational movement, relative to the friction element 1708*a*, about the cylindrical element 1726, and the friction element 1708*a* is prevented from further counter-clockwise rotational movement, relative to the friction element 1706*a*, about the cylindrical element 1726.

When the hinge assembly 1700 is integrated into a consumer device (not shown in FIG. 26), the hinge assembly 1700 may place a pair of housing parts, or a pair of sections, of the consumer device in a closed position or an open position, based upon the relative positions of the friction elements. As shown in FIG. 26, the hinge assembly 1700 is in the open position. Also, the friction element 1706*a* is separated by the friction element 1708*a* by an angle of separation 1720, which represents the angle of separation between two housing parts or two sections of a consumer device. The angle of separation 1720 approximately in the range of 90 to 150 degrees. However, the friction element 1706*a* can rotate counter-clockwise and can be positioned adjacent to the friction element 1708*a*, and the hinge assembly 1700 is in the closed position. In the closed position of the hinge assembly 1700, and other hinge assemblies described herein, the angle of separation 1720 between the friction elements is approximately 0 degrees.

The various embodiments of each hinge assembly may include a combination of components and features described for other hinge assemblies. For example, each hinge assembly may be modified to include tensioning members, fasteners, and integrated stop mechanisms, as non-limiting examples.

Figure 27:
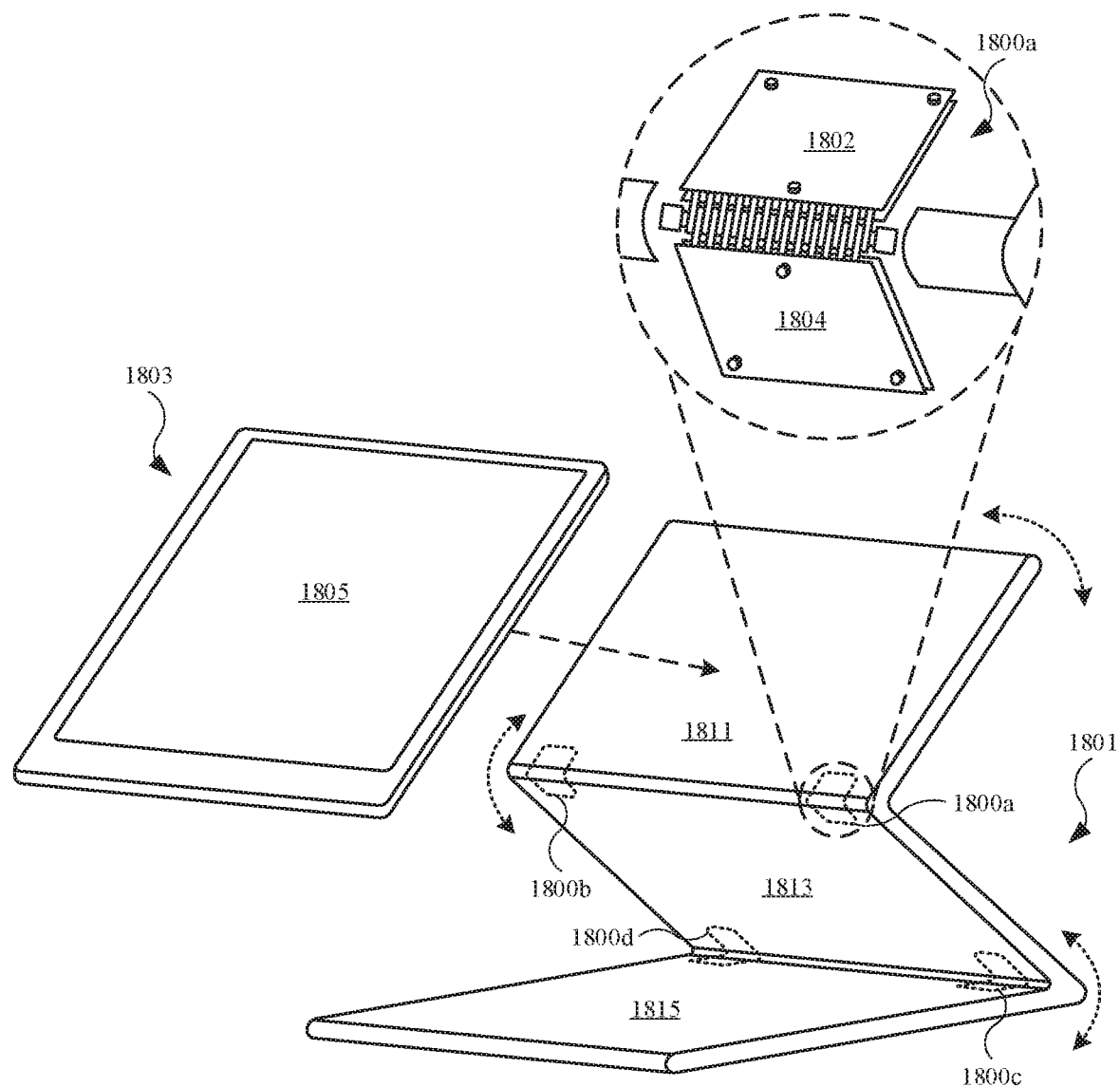
FIG. 27 illustrates an isometric view of an embodiment of an accessory device designed for use with a portable electronic device, in accordance with some described embodiments.
Figure 28:
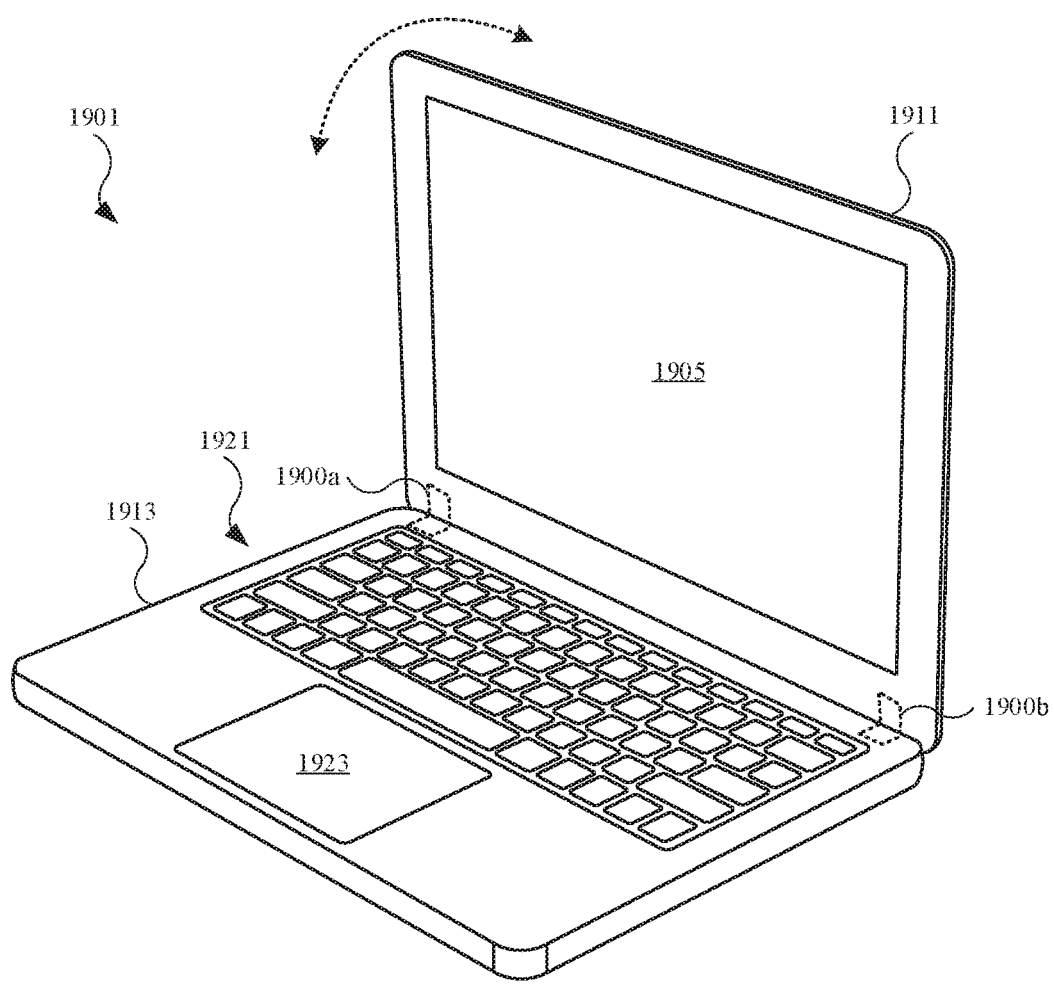
FIG. 28 illustrates an isometric view of an embodiment of an electronic device, in accordance with some described embodiments.

FIGS. 27 and 28 show various consumer devices that may incorporate one or more of the aforementioned hinge assemblies. As a result, the consumer devices may include housing parts or sections capable of rotation based on one or more of the hinge assemblies. FIG. 27 illustrates an isometric view of an embodiment of an accessory device 1801 designed for use with a portable electronic device 1803, in accordance with some described embodiments. The accessory device 1801 may include a folio device designed to receive, carry, and cover the portable electronic device 1803. As shown, the accessory device 1801 may include a first section 1811 and a second section 1813 coupled to the first section 1811. The accessory device 1801 may further include a hinge assembly 1800*a* and a hinge assembly 1800*b* coupled to the first section 1811 and the second section 1813. The hinge assembly 1800*a* and the hinge assembly 1800*b* allow rotational movement of the first section 1811 relative to the second section 1813, and vice versa. The accessory device 1801 may include a third section 1815 coupled to the second section 1813. The accessory device 1801 may further include a hinge assembly 1800*c* and a hinge assembly 1800*d* coupled to the second section 1813 and the third section 1815. The hinge assembly 1800*c* and the hinge assembly 1800*d* allow rotational movement of the second section 1813 relative to the third section 1815, and vice versa.

As shown in the enlarged view, the hinge assembly 1800*a* includes a first hinge section 1802 coupled to the first section 1811. The hinge assembly 1800*a* further includes a second hinge section 1804 coupled to the second section 1813. The hinge assembly 1800*a* includes friction elements (not labeled) associated with the first hinge section 1802 and coupled to the first section 1811. The hinge assembly 1800*a* further includes friction elements (not labeled) associated with the second hinge section 1804 and coupled to the second section 1813. The first hinge section 1802 and the second hinge section 1804 are coupled to their respective accessory device sections by fasteners (not labeled).

The first section 1811 is designed to receive and carry the portable electronic device 1803. The receiving means may include magnetic elements embedded in the accessory device 1801 and in the portable electronic device 1803. Also, when the first section 1811 carries the portable electronic device 1803, the third section 1815 capable of rotating with respect to the second section 1813 and covering a display 1805 of the portable electronic device 1803.

FIG. 28 illustrates an isometric view of an embodiment of an electronic device 1901, in accordance with some described embodiments. The electronic device 1901 may include a laptop computing device. As shown, the electronic device 1901 may include a first housing part 1911, or first section, that carries a display 1905 of the electronic device 1901. The electronic device 1901 may further include a second housing part 1913, or base portion, that includes a keyboard 1921 and a touch pad 1923, both of which are designed to generate an input or command to a processing system (not shown in FIG. 28) of the electronic device 1901. The electronic device 1901 may further include a hinge assembly 1900*a* and a hinge assembly 1900*b*, both of which are coupled to the first housing part 1911 and the second housing part 1913. The hinge assembly 1900*a* and the hinge assembly 1900*b* allow for rotational movement of the first housing part 1911 with respect to the second housing part 1913, and vice versa. The hinge assembly 1900*a* and the hinge assembly 1900*b* allow the first housing part 1911 to rotate over the second housing part 1913 such that the display 1905 is positioned over the keyboard 1921, thereby defining a closed positioned. The hinge assembly 1900*a* and the hinge assembly 1900*b* allow the first housing part 1911 to rotate away from the second housing part 1913, thereby defining an open positioned.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An accessory device for use with an electronic device, the accessory device comprising:
   a first section that receives the electronic device;
   a second section connected to the first section; and
   a hinge assembly that rotationally couples the first section with the second section, the hinge assembly comprising:
      a first friction element coupled to the first section, and
      a second friction element coupled to the second section, the second friction element in frictional engagement with the first friction element by a frictional force, wherein an applied force to the first section that overcomes the frictional force causes the first section to rotate relative to the second section.

2. The accessory device of claim 1, further comprising:
   a first through hole formed in the first friction element;
   a second through hole formed in the second friction element; and
   a cylindrical element that passes through the first through hole and the second through hole.

3. The accessory device of claim 2, wherein the frictional force is parallel an axial direction defined by the cylindrical element.

4. The accessory device of claim 2, wherein the hinge assembly further comprises a tensioning mechanism coupled to an end of the cylindrical element, the tensioning mechanism capable of adjusting the frictional force.

5. The accessory device of claim 1, wherein the hinge assembly further comprises:
   a first set of panels positioned in the first section and surrounding the first friction element; and
   a second set of panels positioned in the first section and surrounding the second friction element.

6. The accessory device of claim 1, further comprising:
   magnets located in the first section; and
   a third section rotationally coupled to the second section, wherein when the magnets magnetically couple with magnets in the electronic device to hold the electronic device with the first section, the first section and the second section position the electronic device over the third section.

7. The accessory device of claim 1, wherein:
   the first friction element comprises a first stop mechanism,
   the second friction element comprises a second stop mechanism, and
   an engagement between the first stop mechanism and the second stop mechanism ceases movement of the first section relative to the second section.

8. An accessory device for use with an electronic device, the accessory device comprising:
   a first section that defines a receiving surface for the electronic device;
   a second section rotationally coupled to the first section by a first hinge assembly, the first hinge assembly comprising:
      a first friction element that extends into the first section and is at least partially covered by the receiving surface, and
      a second friction element that extends into the second section, the second friction element in frictional engagement with the first friction element by a first frictional force that is capable of fixing the first section relative to the second section; and
   a third section rotationally coupled the second section by a second hinge assembly, the second hinge assembly comprising:
      a third friction element that extends into the second section,
      a fourth friction element that extends into the third section, the fourth friction element in frictional engagement with the third friction element by a second frictional force that is capable of fixing the second section relative to the third section.

9. The accessory device of claim 8, wherein a first applied force to the first section that overcomes the first frictional force causes the first section to rotate relative to the second section, and wherein a second applied force to the second section that overcomes the second frictional force causes the second section to rotate relative to the third section.

10. The accessory device of claim 8, further comprising:
    a first shaft that passes through the first friction element and the second friction element; and
    a second shaft that passes through the third friction element and the fourth friction element,
    wherein the first frictional force is parallel to a first axial direction defined by the first shaft, and wherein the second frictional force is parallel to a second axial direction defined by the second shaft.

11. The accessory device of claim 10, further comprising:
    a first folding region between the first section and the second section; and
    a second folding region between the second section and the third section, wherein the first shaft is aligned with the first folding region, and wherein the second shaft is aligned with the second folding region.

12. The accessory device of claim 10, wherein the first hinge assembly further comprises:
    a mounting structure; and
    a third shaft that passes through the first friction element, wherein the first shaft and the third shaft further pass through the mounting structure.

13. The accessory device of claim 10, wherein the first hinge assembly further comprises:
    a mounting block; and a third shaft that passes through the first friction element, wherein the first shaft and the third shaft further pass through the mounting block.

14. The accessory device of claim 8, wherein the first hinge assembly further comprises:
   a spacing element comprising an opening; and
   a fifth friction element that extends into the first section and is at least partially covered by the receiving surface; and
   a shaft, wherein i) the spacing element is positioned between the first friction element and the fifth friction element, and ii) the shaft passes through the first friction element, the fifth friction element, and the shaft.

15. An accessory device for use with an electronic device, the accessory device comprising:
   a first section;
   a second section; and
   a hinge assembly, comprising:
      a first element comprising a first through hole, the first element further comprising a first extension coupled with the first section,
      a second element comprising a second through hole, the second element further comprising a second extension coupled with the second section,
      a friction element comprising a third through hole, friction element engaged with the first element and the second element by an applied force that is normal with respect to the first element and the second element, and
      a cylindrical element that passes through the first through hole, the second through hole, and the third through hole, wherein a rotational force to the first section that overcomes the applied force and causes movement of the first section and the first element relative to the second section and the second element, respectively.

16. The accessory device of claim 15, further comprising:
   magnets located in the first section; and
   a third section rotationally coupled to the second section, wherein when the magnets magnetically couple with magnets in the electronic device to hold the electronic device with the first section, the first section and the second section position the electronic device over the third section.

17. The accessory device of claim 15, wherein the rotational force causes the first element to rotate around the cylindrical element.

18. The accessory device of claim 15, wherein the friction element provides a variable friction based upon the movement of the first element.

19. The accessory device of claim 18, comprises a cam surface that causes the variable friction.

20. The accessory device of claim 15, wherein the friction element is positioned between the first element and the second element.

\* \* \* \* \*